June 23, 1953  G. W. TOMPKIN  2,642,997
CENTRIFUGAL MACHINE
Filed Feb. 14, 1946  10 Sheets-Sheet 1

Inventor
George W. Tompkin
By Ritter, Machlin & Muir
His Attorneys

June 23, 1953 — G. W. TOMPKIN — 2,642,997
CENTRIFUGAL MACHINE
Filed Feb. 14, 1946 — 10 Sheets-Sheet 3

Inventor
George W. Tompkin
By Ritter, Machlin & Muir
his Attorneys

June 23, 1953 G. W. TOMPKIN 2,642,997
CENTRIFUGAL MACHINE
Filed Feb. 14, 1946 10 Sheets-Sheet 4
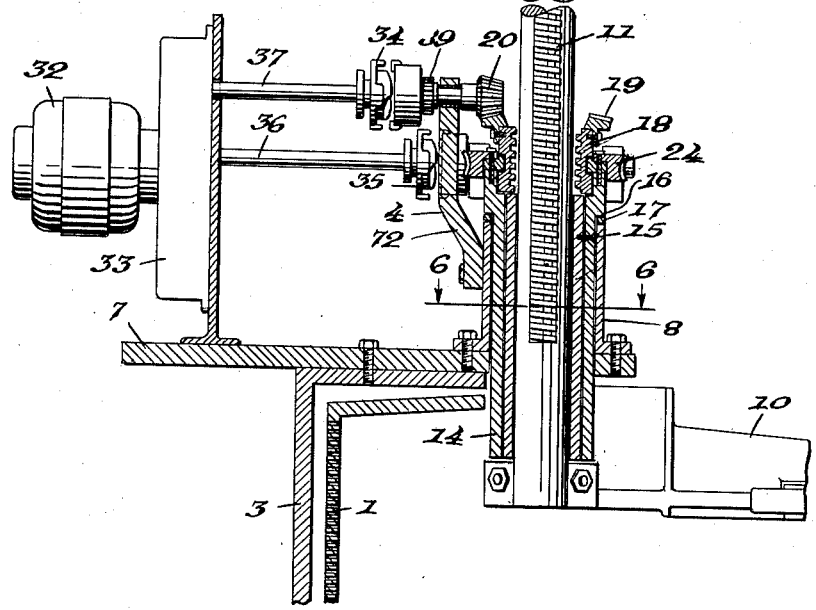
Fig. 5
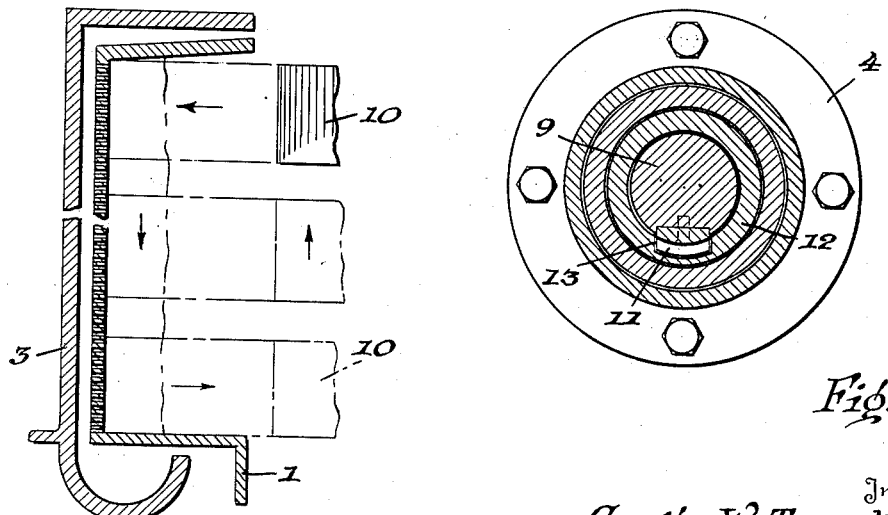
Fig. 9
Fig. 6
Inventor
George W. Tompkin
By Pitter, Mechlin & Muir
his Attorneys

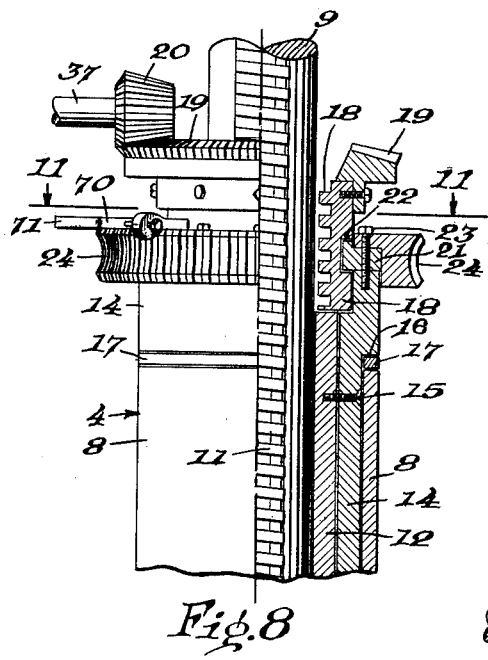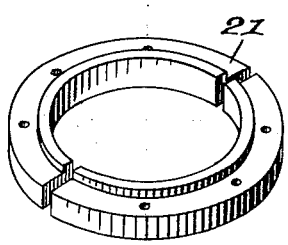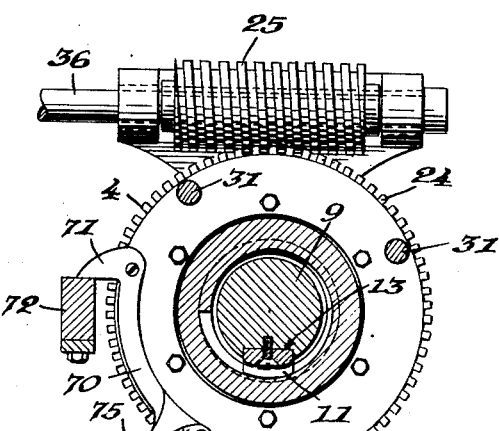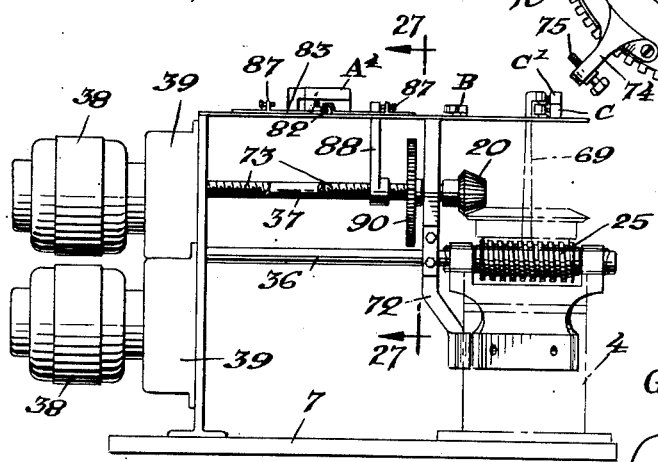

June 23, 1953  G. W. TOMPKIN  2,642,997
CENTRIFUGAL MACHINE
Filed Feb. 14, 1946  10 Sheets-Sheet 6

Inventor
George W. Tompkin
By Ritter, Mechlin & Muir
His Attorneys

June 23, 1953          G. W. TOMPKIN          2,642,997
CENTRIFUGAL MACHINE
Filed Feb. 14, 1946                           10 Sheets-Sheet 7

Inventor
George W. Tompkin

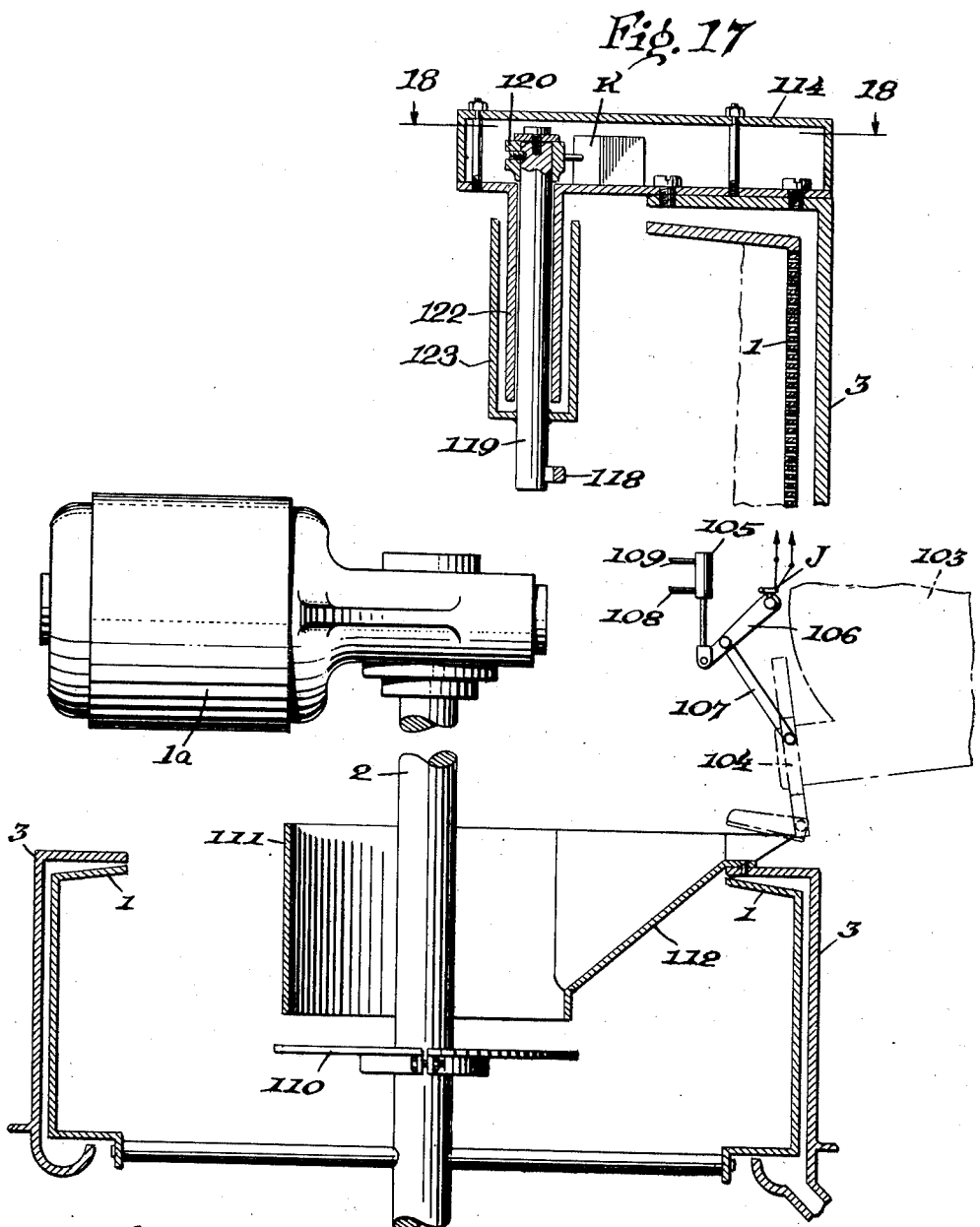

June 23, 1953     G. W. TOMPKIN     2,642,997
CENTRIFUGAL MACHINE
Filed Feb. 14, 1946     10 Sheets-Sheet 9
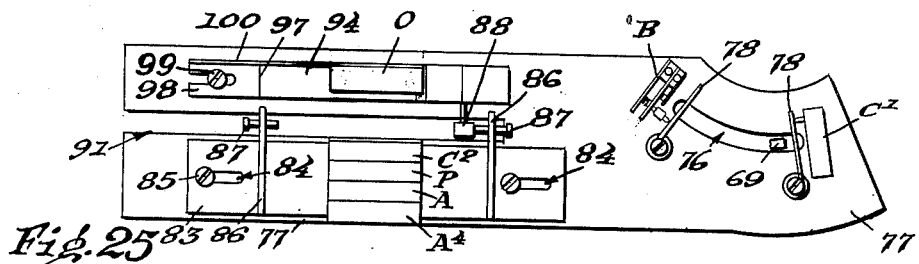
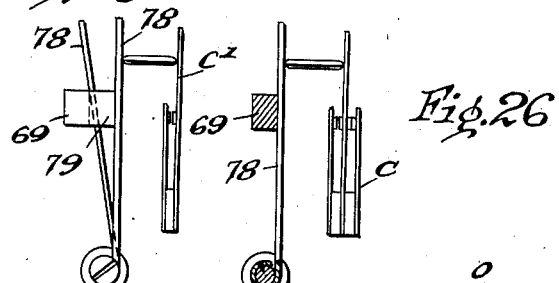
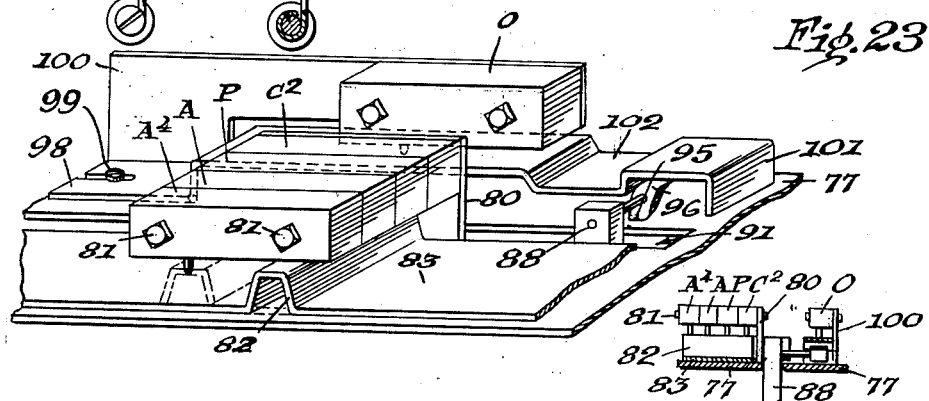
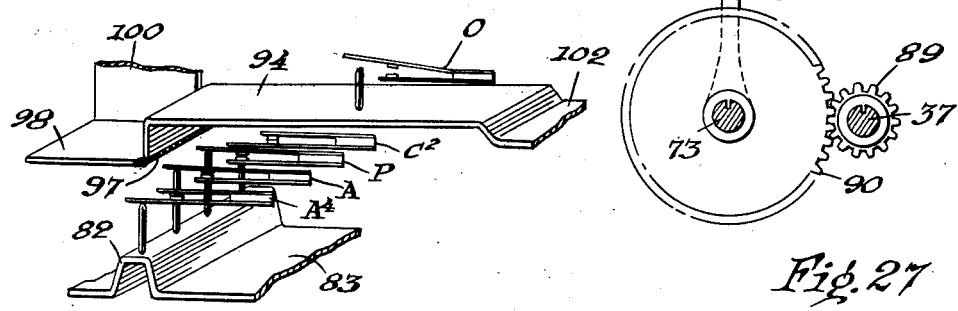
Inventor
George W. Tompkin
By Ritter, Mechlin & Muir
his Attorneys Patented June 23, 1953

2,642,997

UNITED STATES PATENT OFFICE 2,642,997

CENTRIFUGAL MACHINE

George W. Tompkin, Lahaina, Territory of Hawaii

Application February 14, 1946, Serial No. 647,582

12 Claims. (Cl. 210—70)

My invention relates to centrifugal machines and particularly to such as are used in the production of sugar wherein a foraminous basket is employed for separating the liquid from the sugar content of massecuite or the like by rotating the basket and its contained charge of massecuite to thereby centrifugally extract the liquid and leave the sugar deposited in an annular band or layer on the circumferential wall of the basket, the sugar being thereafter freed from the screened wall of the basket through the operation of a discharger adapted to cut or plow the sugar loose from the screen.

Realizing the necessity of providing a simple centrifugal control system having features designed to overcome well known difficulties inherent in available systems, I have provided a control system which is applicable to any type of centrifugal and is completely independent of the drive thereof.

Where automatic mechanical discharging is used, it is well known that systems heretofore devised for controlling the operations of the centrifugal machine have been designed around some particular means of driving the centrifugal and, in fact, form a part of the machine. They are, therefore, specifically limited in application. The purpose of this invention is to eliminate this difficulty and provide a means which is universally applicable to all types of centrifugal machines regardless of motive power or other specific characteristics.

The invention is comprised of several primary units consisting of a motorized discharger having certain unique features, a governor which integrates the actions of filling, drying and discharging and all operations pertaining thereto, the housing for several small units, such as a reversing switch and cycle timer, and a unit to control the charge to the basket.

These units supply the necessary impulses for complete control of a centrifugal machine. Although the application of these impulses is shown as applied to a machine driven by water power, it will be readily appreciated that the invention is equally applicable to an electric driven machine, a machine driven through a fluid or torque controlled coupling and to a belt driven machine.

The discharger is a small compact unit embodying features designed to eliminate certain weaknesses inherent in previous designs. It is driven by a motor through small electrical operated clutches which engage and disengage under the control of snap action limit switches. It may be operated independently of the remainder of the control for testing or for manual operation.

Since sturdiness and trouble free operation is a prime necessity in a discharger of this type and compactness is likewise an important consideration, one of the object of this invention is to provide the necessary means for accomplishing the movements of the discharger plow which are positive in action and have great mechanical strength.

Another primary object of the invention is to provide a discharger which requires no manual intervention during the sequence of its operations necessary to the discharge of sugar from the centrifugal basket of the machine and which is so constructed and controlled that it may be safely operated by a motor, instead of manual labor, without danger of damaging the machine by accidentally fouling the screen during the discharging operation.

Another important object of the invention is to provide means in synchronized relation to the basket of the centrifugal machine for governing the operation of the discharger.

A principal feature of the invention consists in providing means responsive to speed of the basket of the centrifugal machine for causing the discharger mechanism of the apparatus to initiate its cycle of operation.

Another primary feature of the invention consists in providing the centrifugal machine with mechanism responsive to a predetermined speed of the basket for admitting to the basket the material that is to be centrifugally separated, and in combining therewith means responsive to the charge of material within the basket for causing admission of the material to the basket to be terminated when the basket has been charged to the desired extent.

A further primary feature of the invention, generally stated, consists in embodying in the centrifugal machine a master timer, a motorized discharger and a governor whose movement is in synchronism with that of the centrifugal basket of the machine, these three devices being electrically connected and interlocked in such a manner that the entire cycle of the machine is performed automatically and with a certainty of control insuring efficiency and economy of operation.

There are other features of invention residing in particular relations of parts and in advantageous forms of construction, all as will hereinafter appear.

In the drawings, illustrating a preferred embodiment of the invention, the scope whereof is pointed out in the claims, Figure 1 is a plan view, partly diagrammatic, of a centrifugal machine embodying my invention having a basket, a motorized discharger, a governor and a timer, showing the preferred relation of these devices to each other and to the means for charging the basket with the material that is to be centrifugally separated.

Figure 5 is a view, partly in elevation and partly in vertical section, showing the discharger in relation to the curb and basket of the centrifugal machine, the shaft of the discharger being rotated somewhat from the position shown in Figure 3 for the sake of clearness.

Figure 6 is a detail sectional view on line 6—6 of Figure 5, the plow device of the discharger being omitted.

Figure 7 is a sectional view on line 7—7 of Figure 3, a portion of the plow of the discharger being omitted.

Figure 8 is an enlarged view, partly in elevation and partly in vertical section, of a portion of the discharger mechanism.

Figure 9 is a vertical sectional view showing the relation of the plow of the discharger to the basket of the centrifugal machine, and illustrating diagrammatically the cycle of movement of the plow.

Figure 10 is a detail perspective view of the split collar which takes the thrust of the discharger shaft.

Figure 11 is a horizontal section on line 11—11 of Figure 8.

Figure 12 is an elevational view of a modified construction wherein two motors are employed for driving the discharger.

Figure 17 is a detail vertical section on line 17—17 of Figure 16.

Figure 21 is a view, partly in elevation and partly in section, on line 21—21 of Figure 1, illustrating the mechanism for filling the centrifugal basket.

Figure 22 is a detail plan view of the discharger switch mechanism.

Figure 23 is a perspective view showing the manner of mounting the snap action switches shown in Figure 22 and the slide by which they are controlled.

Figure 24 is a detail perspective view illustrating the relationship of the three snap action switches shown in Figure 2 when actuated by their operating slide.

Figure 25 is a diagrammatic plan view of a single pole single throw snap action switch mechanism employed in controlling the action of the discharger.

Figure 26 is a diagrammatic plan view of a single pole double throw snap action switch mechanism also employed in controlling the discharger.

Figure 27 is a fragmentary detail sectional view on line 27—27 of Figure 12.

Figure 1:
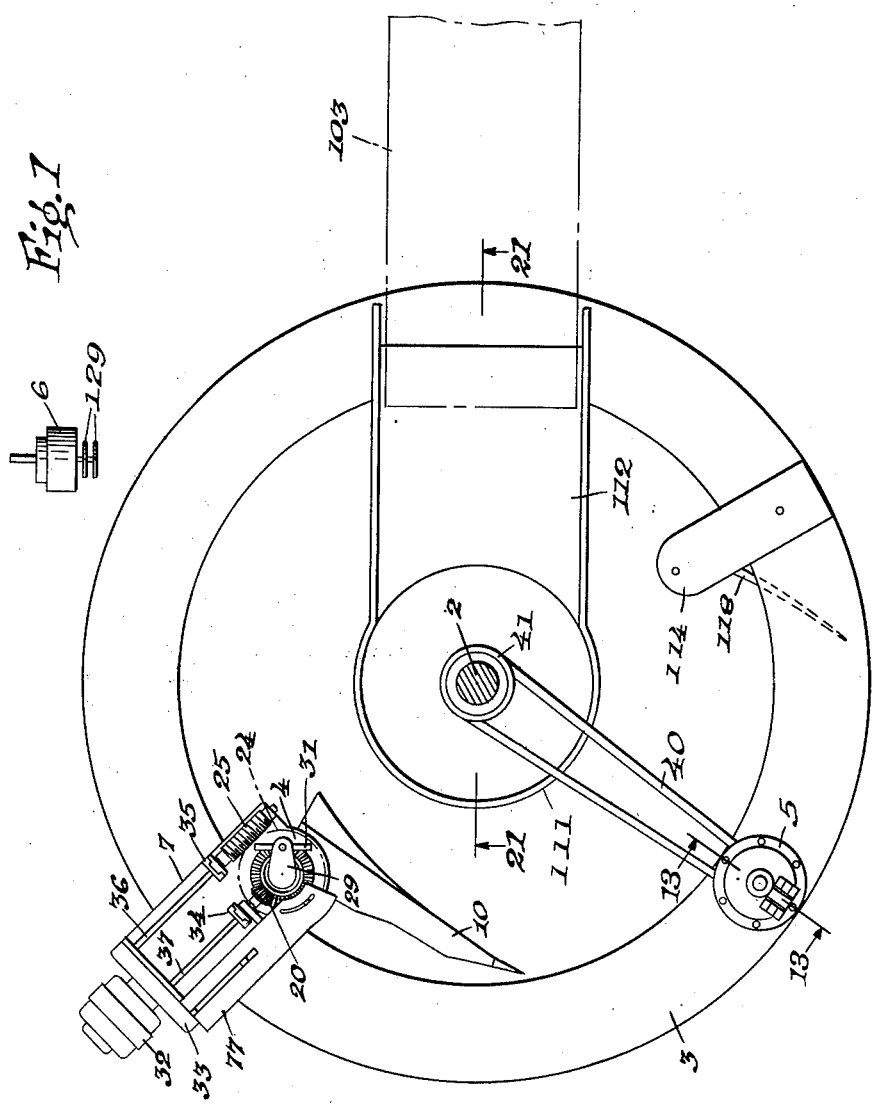
Figure 2:
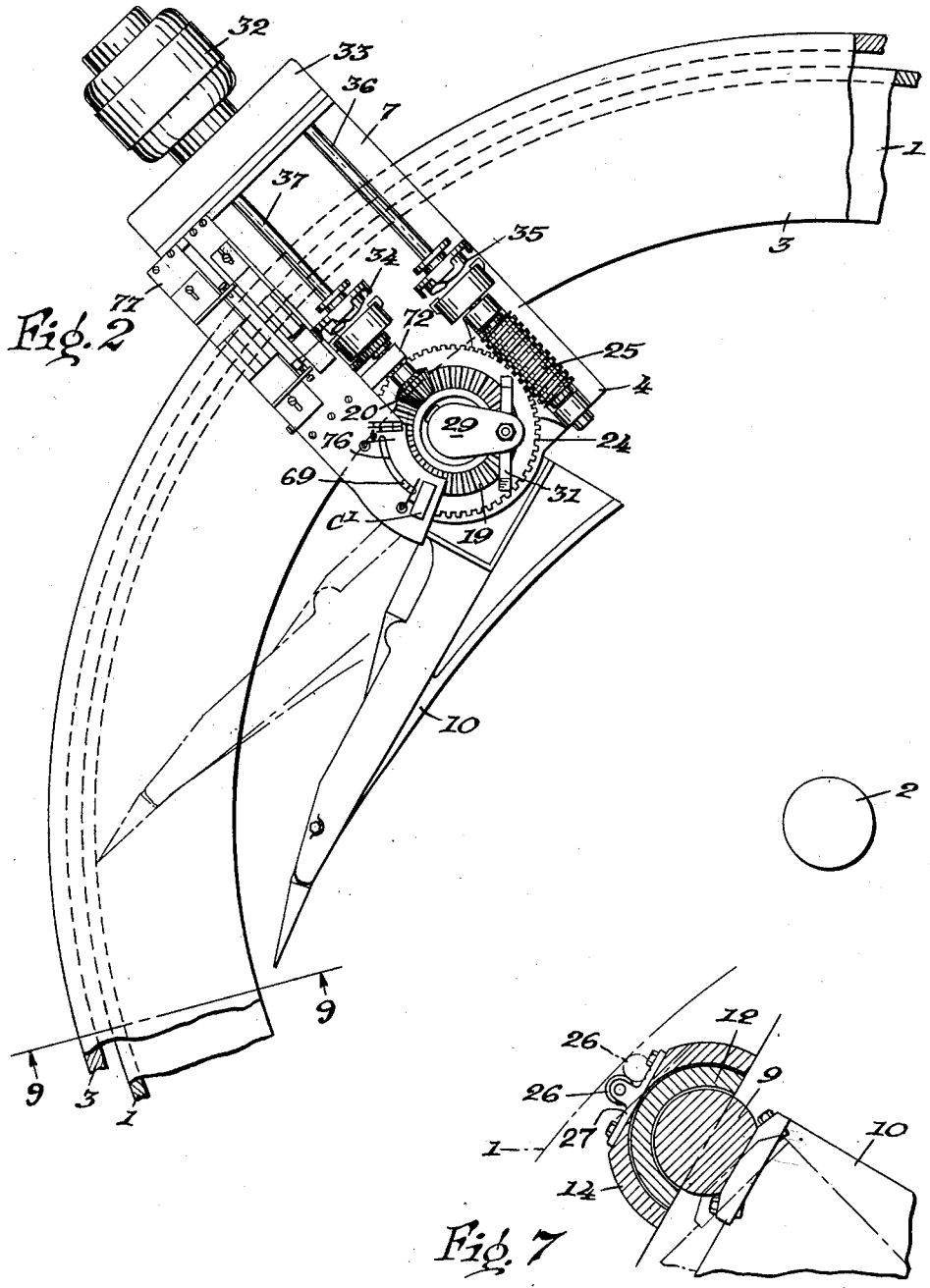
Figure 2 is an enlarged plan view of the motorized discharger shown in Figure 1, together with the shaft of the centrifugal basket and portions of the basket and its encircling curb.

In the drawings, 1 indicates the foraminous basket or screen of a centrifugal machine used in the production of sugar and 2 is the vertical shaft upon which it is mounted and by which it is rotated, while 3 is the curb or casing within which the basket is housed. These parts of a centrifugal machine, as well as suitable brake mechanism (not shown) for controlling the rotatable basket, are familiar features of centrifugal machines employed in the sugar making art and may be of any usual or preferred construction. The means for applying power to the centrifugal machine to drive the basket, apply and release the brakes and control the gate by which a charge of material is admitted to the basket may be such as now commonly employed or as may be suitable for the purpose, as, for example, motor mechanism driven hydraulically or electrically, the centrifugal machine illustrated in the accompanying drawings being electrically driven and having its basket driven by electric motor $1a$.

Associated with the centrifugal basket 1 are the discharger 4, a governor 5 and a timer 6, all of which are electrically interlocked. The discharger and the governor are preferably mounted on the curb 3, but it will usually be found more convenient not to mount the timer thereon. There are certain other devices which also are preferably mounted upon the curb 3, as will hereinafter appear.

The discharger or unloader mechanism 4 differs greatly from the dischargers heretofore in use, its construction enabling it to be driven by a motor while permitting its parts so to act in relation to each other that the device may reliably and safely perform by itself the proper sequence of operations necessary to the discharging of the centrifugal basket. The discharger may be conveniently mounted on the top of the curb 3 by means of a base plate 7 to which is rigidly secured an upwardly extending cylindrical sleeve 8 supporting the discharger and within which the discharger is rotatable.

The discharger 4 is formed with a shaft 9 to the lower end of which is rigidly attached a plow 10 for discharging the sugar material by cutting it away from the screen wall of the basket 1. The plow may be of any suitable or well known form. The discharger shaft 9 is provided with a vertically extending series of interrupted or sectional screw threads 11 which (see Fig. 6) may conveniently be formed upon a bar snugly fitting into a longitudinally extending recess of the shaft 9 and securely positioned therein by means of screws. Encircling the shaft 9 is a sleeve or bushing 12, preferably of bronze, which is provided on its interior with a slot or keyway 13 for receiving the column of threads 11, the shaft 9 thus being enabled to slide up and down within the bushing 12 but being caused to turn therewith when the bushing rotates. The sleeve or bushing 12 fits closely within a surrounding cylindrical sleeve 14 and is firmly secured thereto by means of screws 15. The sleeve 14 extends through and is rotatable within the stationary sleeve 8 which is secured to the top of the curb 3 of the centrifugal machine, said sleeve 14 being formed at its upper end with a downwardly facing shoulder 16 between which and the upper end of the supporting sleeve 8 a thrust ring 17 may be advantageously interposed, the weight of the discharger being thereby transmitted to the sleeve 8.

Encircling the discharger shaft 9 and cooperating with the series of interrupted threads 11 thereof to raise and lower said shaft is a nut member 18 to the upper end of which is secured a bevel gear 19 that is driven by a bevel pinion 20. The driving nut 18 is rotatably mounted upon the upper end of the rotatable sleeve 14, preferably by means of a split ring 21 which enters a circular groove 22 on the exterior face of the nut and which is secured to said sleeve by means of screws 23. Surrounding the revoluble nut 18 and rigidly secured to the upper end of the rotatable sleeve 14, as by means of the screws 23 which also secure the split ring 21 to said sleeve, is a worm gear 24 that is driven by the worm 25.

At its lower end the discharger 4 may advantageously be provided with a roller 26 for preventing the screen wall of the basket 1 from being injured by the tip of the plow 10 when material that is hard to discharge is being plowed from the basket. As the discharger turns to cause the plow tip to approach the screen wall of the basket the roller 26, which is preferably mounted on a bracket 27 rigidly secured to the lower end of the sleeve 14 of the discharger, likewise approaches the screen. When the plow tip reaches the screen the roller assumes a position, as shown in dotted lines in Fig. 7, in which it is on the center line of the basket and just clearing the basket rim. Normally the roller does not touch the rim of the basket unless the material which is being operated upon is hard to discharge, in which event the roller by engaging the rim of the basket prevents the basket 1 from being pulled inwardly by the plow 10 as a result of its cutting action.

For arresting the downward movement of the discharger in case the limit switches provided for that purpose should fail, the shaft 9 may have mounted thereon an adjustable mechanical stop 28 which has threaded engagement with a plate member 29 rigidly secured to said shaft and projecting laterally therefrom. This stop member may be conveniently formed as a threaded bolt which is maintained in adjusted position by means of a nut 30. By coming into contact with a cooperating stop member 31 mounted on the upper face of the worm gear 24, the stop 28 serves to limit the downward travel of the plow 10 with respect to the centrifugal basket 1. The stop 31 is preferably made as a frame having the general form of an inverted U so as to straddle a portion of the bevel gear 19 and thus enable the stop member 28 to be positioned sufficiently close to the discharger shaft 9 to prevent too great leverage being communicated to the plate 29 by the adjustable stop 28.

A mechanical stop for arresting upward movement of the shaft 9 in the event the limit switches should fail is afforded by the lower end of sleeve 14 with which the plow 10 is adapted to come into engagement. As in the case of the mechanical stop means for arresting downward movement of the discharger shaft 9, the mechanical stop means for arresting upward movement of the shaft only operates should the limit switches fail to function.

Power is applied to the discharger 4 by means of an electric motor 32 which drives the bevel pinion 20 and the worm 25 through the intermediacy of any suitable reducing gearing 33 (shown diagrammatically) and the respective solenoid operated clutches 34 and 35 which are controlled by suitable limit switches, the speed of rotation of the worm shaft 36 being considerably slower than that of the shaft 37 of the bevel pinion. The motor 32 may be and preferably is a three phase 60 cycle 440 volt squirrel cage induction motor, 1750 R. P. M., and is usually required to be of only one-fourth H. P., but it will be understood that the size of the motor depends upon its application. For low grade sugar the motor reducing gearing 33 may advantageously deliver 7.48 R. P. M. to the worm shaft 36 and 170.4 R. P. M. to the pinion shaft 37. These speeds may, of course, be varied to suit any particular application. The bevel pinion 20 and the worm 25 are preferably driven by means of a single motor reducing gearing unit 33 rather than by individual motor reducers, for while no clutches would be needed if individual motor reducers are used solenoid brakes would be required to insure proper control of the bevel pinion and worm.

The parts just described comprise the mechanical structure of the motorized discharger which is the central feature of this invention and by virtue of which the discharging phase of the cycle of the centrifugal machine is made mechanical. The discharger is so designed that it may be operated by itself simply by closing a switch U, or automatically by the governor 5 when the machine is decelerated to a speed safe for cutting. Such speed may be any speed between 40 and 60 revolutions per minute, speeds below 40 revolutions per minute being too slow and speeds above sixty revolutions per minute being too fast for safe operation. When motor 32 is started, the members of clutch 35 (see Figure 28) engage and thereby rotate worm 25 and worm gear 24 which is mounted on the upper end of sleeve 14 to which the bronze bushing 12 is secured, the bushing having a keyway to accommodate shaft 9 with its thread section 11. The plow 10 is mounted on the lower end of shaft 9 so that as the worm 24 rotates this assembly slowly rotates in a clockwise direction within the fixed housing 8. The tip of the plow thus approaches and enters the dried material in the basket 1. When it reaches the basket wall, a strip the width of the plow 10 is, of course, removed. Inward movement of the plow is then stopped by the limit switches to be described which, upon being actuated, cause the members of clutch 35 to disengage. At the same time, clutch 34, to be hereinafter described, is energized causing the plow to move downwardly by rotating the pinion gear 20 which, in turn, drives bevel gear 19 to which is attached the interiorly threaded circular nut 18. This nut is so mounted on the top of sleeve 14 that it only engages the threaded section 11 of shaft 9. Rotation of nut 18, therefore, slowly lowers shaft 9 so that the plow 10 moves toward the bottom of the basket. Since the downward movement of shaft 9 is coordinated with the speed of rotation of the basket, the charge therein is completely removed. When the plow reaches its lowest position, the driving motor is reversed by mechanism hereinafter described and the plow moves away from the basket and then rises to its original starting position. The outward and upward movements of the plow may be made to occur simultaneously as hereinafter explained.

An optional method of driving the discharger 4 is illustrated in Figure 12 of the drawings. In that case two motors 38 with their appropriate individual reducing gearings 39 are employed, one serving to drive the bevel pinion 20 and the other driving the worm 25. In such a construction, the clutches 34 and 35 are unnecessary, the motors themselves being started and stopped by small magnetic switches whose respective solenoids take the place of the solenoids which effect the operation of the clutches.

The centrifugal governor 5, which coordinates the operations of the basket 1, the discharger 4 and the filling gate 104, may be conveniently driven from the shaft or spindle 2 of the basket by means of a belt 40 of V-form in cross section which passes around a pulley 41 carried by said spindle and also around a pulley 42 secured to the main shaft 43 of the governor, the top speed of the shaft 43 advantageously being in the neighborhood of 4000 R. P. M.

The vertically slidable governor member 44, which is connected to the main shaft 43 of the governor in a well known manner by means of pivoted links 45 with their pivotally attached weights 46, is formed as a hollow cylinder within which is a rod 47 that extends through the bore of the shaft 43 and thence upwardly through the casing 48 containing oil for lubricating the governor, oil under pressure being conveniently supplied to the casing through a suitable pipe 49 and passing therefrom through a pipe 50.

The vertically sliding member 44 by which the rod 47 is supported has a sliding fit with the main shaft 43, the lower portion 51 of said shaft being of hollow cylindrical form to receive the sliding member 44 and being slotted to provide clearance for the link attaching lugs of the part 44. The main shaft 43 is preferably provided with ball bearings 52 which are mounted within the casing 48 upon a supporting member 53 which is attached to the casing and is provided with suitable oil ports or ducts. The rod 47 is supported by the vertically sliding hollow member 44 of the governor. It preferably rests upon a ball 54 which is interposed between it and said member 44, said rod and said member being suitably cupped to receive the ball and thus maintain it in proper position. Upward movement of the rod 47 is limited by the upper end of the member 44 coming into contact with the downwardly facing interior shoulder of the main shaft 43 of the governor, the upward movement of the rod preferably being thereby arrested when the speed of the centrifugal basket 1 is about 300 R. P. M. The lower end of the vertically sliding governor member 44 is always submerged in oil and is closed except for small holes 55 which are drilled at such an angle as to act as a centrifugal pump for supplying oil to the ball 54 and the rod 47.

Mounted upon the cover of the oil containing casing 48 is a housing 56 within which is a spring 57 which is seated upon the upper end of the vertically slidable rod 47, the spring housing 56 being slotted longitudinally to permit vertical movement of a switch actuating member or bar 58 which is movable with the rod 47 and preferably is screwed into the upper end of said rod and projects laterally therefrom through the housing 56. The spring housing may be conveniently screwed into the cover of the casing 48 and is preferably provided at its lower end with a bushing 59 having a sliding fit with the rod 47. At its upper end the spring housing 56 may be advantageously provided with an adjusting screw 60 whereby the pressure of the spring opposing upward movement of the rod 47 may be regulated.

The switches D, E, F, G, H and I which are controlled by the movement of the laterally extending bar 58 carried by the slidable rod 47 of the governor 5 are preferably mounted upon a frame 61 that is rigidly secured to the cover 62 for the pulley 42 of the governor main shaft 43. These switches, which are conveniently arranged in two rows with three switches positioned at each side of the switch actuating bar 58, may be of any suitable form but preferably are of the well known type of snap action switch.

These switches are respectively actuated by members 63 which are mounted upon the frame 61 and are interposed between the bar 58 of the governor and the switches. They are mounted upon the frame 61 with capability of lateral motion enabling them to actuate their respective switches and they may advantageously be formed from bronze rods of small diameter, each rod being threaded at its top for cooperating with a corresponding nut 64 loosely mounted in a slot or opening formed in the upper part of the frame 61. Below its threaded portion each of the rods or bars 63 is cut away so as to become of rectangular cross section and provide a tapered projection 65 on the side thereof adjacent the governor bar 58 at the approximate point of travel of said bar at which the switch is to operate, the projections of the bars being respectively disposed at different elevations. At the bottom, the members 63 are preferably of circular form and each is suitably slotted to receive a flat guide 66 rigidly secured to the frame 61, the rod thus being prevented from turning while being capable of moving toward its switch. The nuts 64 enable the bars 63 to be accurately adjusted vertically to their proper positions.

The laterally extending governor bar 58 is provided with four small rollers 67 which respectively operate switches D, F, G and H by engaging the projections 65 upon the rods 63 and shifting said rods laterally toward their corresponding switches, the rods being returned to normal position by the spring action of the switches. The governor bar 58 is also provided with two small pivoted levers or dogs 68 each of which swings in one direction only, one of said dogs serving to operate the switch E momentarily as the governor bar 58 moves downwardly and the other acting to momentarily operate the switch I as the said governor bar moves upwardly.

The switch D is a single pole single throw switch, normally open. It is in parallel with the power side of a single pole double throw snap action switch L which supplies power to either the power or the brake circuit of the centrifugal. The circuits here referred to as the power and brake circuits are composed of switch L, switches F and D and solenoids 131 and 132. In considering the operation of these circuits, it must be borne in mind that the entire control of the machine with its various parts and interlocking circuits is not a part of the centrifugal machine itself as the purpose thereof is merely to take over the control of a centrifugal machine, including the charging and discharging. Thus, when it is said that power is applied to the machine, it is meant that an impulse is supplied by the control which will, when properly converted, cause the driving means to be applied. How these impulses are converted for operating a hydraulically driven centrifugal machine are only shown for purposes of illustration.

The single pole double throw switch L has one side normally closed. During the running cycle, the timer 6 holds this side open and the other or power applying side closed. As the center member of switch L is connected to one side of the supply line, this allows current to flow through solenoid 131 and return to the other side of the supply line through the common connection of solenoids 131 and 132. Across this side of L is the switch D in the governor 5 which likewise can close this circuit and cause power to be applied. The other side of switch L which is normally closed is held open by the timer during the running cycle, at the end of which it is permitted to close and allow current to flow through switch F in the governor and solenoid 132. This applies whatever means is used for braking. When a safe speed for discharging has been reached, the governor opens switch F, the brake is removed and the centrifugal coasts. At about this same time the governor momentarily closes switch E which starts the discharger. As the plow of the discharger enters the charge, the basket slows down and will come to a stop were it not for switch D which the governor closes, thereby by-passing the open side of switch L and causing power to be applied. Switch D might be termed a jogging switch as it is open at all speeds above discharging speed. When the centrifugal machine is in the at-rest position, as shown in the wiring diagram, Fig. 28, the switch D is closed. By its opening and closing in response to the movement of the rod 47 of the governor the speed of the basket 1 is maintained reasonably constant during the cutting operation of the plow 10 of the discharger. The switch E is a single pole single throw switch, normally open. It is operated by the laterally projecting bar 58 only when said bar is moving downwardly and the centrifugal basket 1 has decelerated until it has reached cutting speed. The switch F is a single pole single throw switch, normally closed. While the machine is braking, it is normally closed and it is opened by the downward movement of the switch actuating member 58 of the governor when the centrifugal basket 1 is decelerated to cutting speed. Opening it opens the brake circuit, releasing the brake for the centrifugal basket. In the wiring diagram, Fig. 28, the machine is at rest and therefore switch F is open.

Figure 28:
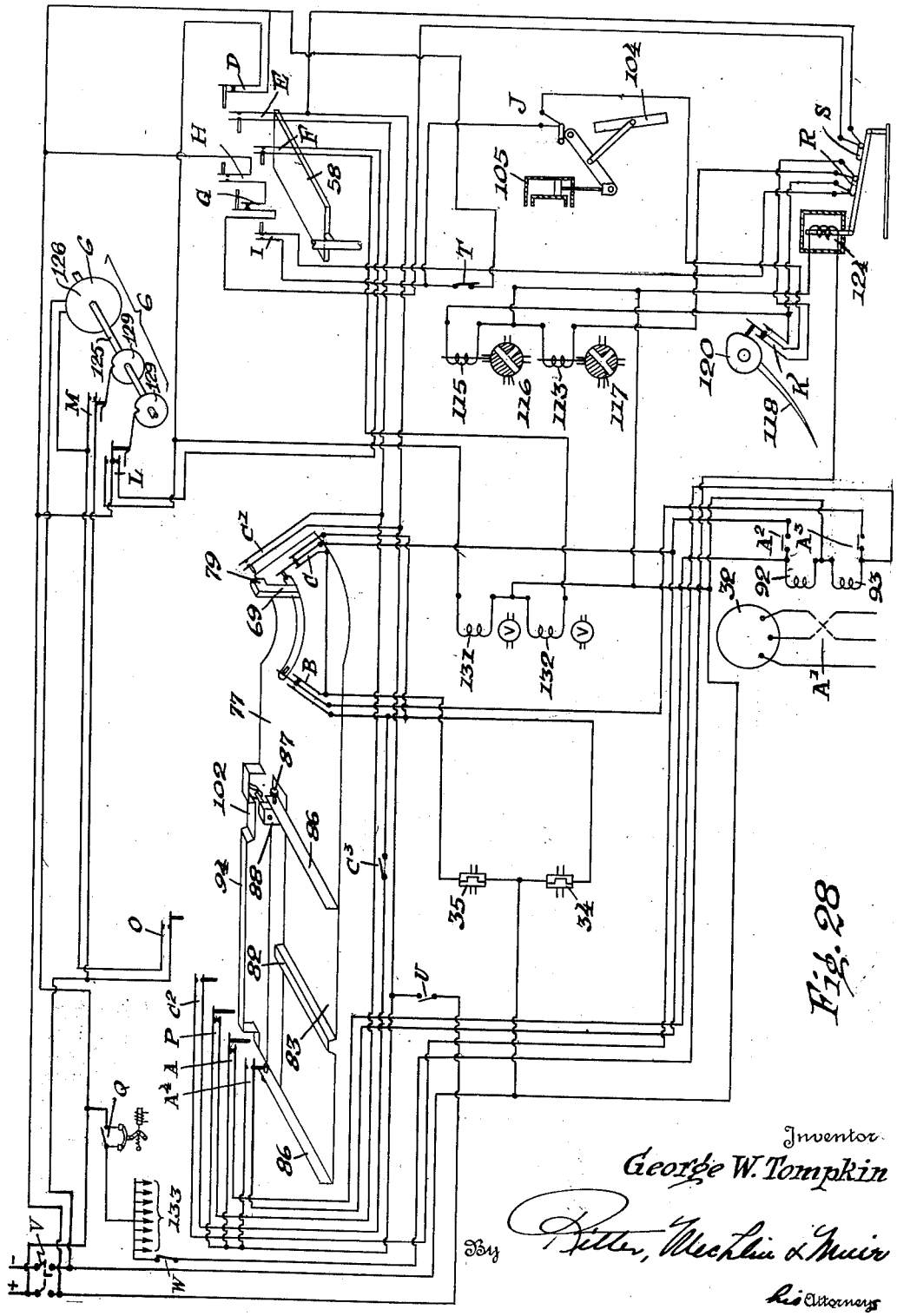
Figure 28 is a wiring diagram of the mechanism showing the control off and the main power circuit on, with the machine at rest.

The switches G and H are single pole single throw snap action switches normally closed. They respectively prevent the operation of the discharger while the basket is running at higher or lower speed than proper discharging speed. The main control circuit of the discharger is completed through them and if either opens the discharger 4 will stop. The main control circuit of the discharger is the circuit through which current flows to the control circuit of the discharger and its reversing switch. In Figure 28, the common side of the reversing switch solenoids 92 and 93 and the common side of the solenoids of clutches 34 and 35 comprise one side of the circuit. The other side of the circuit is completed through switches G and H in the governor or the test switch U. The switch G, which is simply a safety device, is opened by the governor at the top of its movement as the basket 1 picks up speed and it holds it open until the machine again slows up for the discharger, or stated otherwise, during the drying cycle of the basket, thus eliminating all danger of the discharger 4 starting to operate while the centrifugal basket 1 is revolving at high speed, an action which otherwise could occur should there be a shorting of the switch E or of either of the switches $C^1$ and P, whose nature and purpose will later appear, the said switches E, $C^1$ and P being in parallel as shown in the wiring diagram. Switch H is set to open just under the cutting speed of the basket, which is any speed of the rotating basket at which it is safe for the plow to enter and remove the dried material, the speed normally ranging between 40 and 60 revolutions per minute. The switches G and H are governor operated and, as previously explained, both are in the circuit supplying energy to the control circuit of the discharger. If either is open, the discharger will not operate. Switch H is opened by the governor below cutting speed to stop the progress of the discharger and allow the basket to pick up speed. This takes place a few revolutions below minimum cutting speed or at about 35 revolutions per minute. This is necessary since the equipment might be used on a centrifugal machine in which the torque delivered to the basket spindle at low speed might not be sufficient to prevent stalling, even with switch D closed and all available power of the driving means applied as previously described. When the basket regain its cutting speed, the governor bar 58 allows the switch H to close and the discharger to start. Switch G as explained elsewhere opens the circuit above cutting speed as a safety precaution to prevent the possibility of the discharger operating while the machine is at high speed.

The switch I is a single pole single throw snap action switch, normally open. It is momentarily closed by the governor when the basket 1 is at proper filling speed, thereby effecting the opening of the gate 104 to admit a charge to the basket.

The rotary movements of the worm gear 24 by which the plow 10 is caused to approach and withdraw from the perforated rim of the centrifugal basket 1 are controlled by switches B, C and $C^1$ which are actuated by an upright finger member 69 rigidly secured to said worm gear. Mechanical stops for limiting the turning movements of the plow 10 in case the limit switches should fail are also preferably provided. For this purpose the worm gear may advantageously have secured to its upper face an arcuate member 70 formed with a stop lug 71 which projects outwardly beyond the worm gear and is adapted to arrest outward rotation of the plow by engaging the bearing support 72 of the bevel pinion shaft 37 and the discharger timer shaft 73. The member 70 is also provided with an outwardly extending lug 74 with which an adjustable stop member 75 has threaded engagement, the member 75 preferably being formed as a bolt that is held in adjusted position by a jam nut and being adapted to arrest the movement of the plow inwardly away from the rim of the basket 1 by coming into engagement with the shaft supporting member 72. The mechanical stops 71 and 75 do not function unless the limit switches fail.

Figure 3:
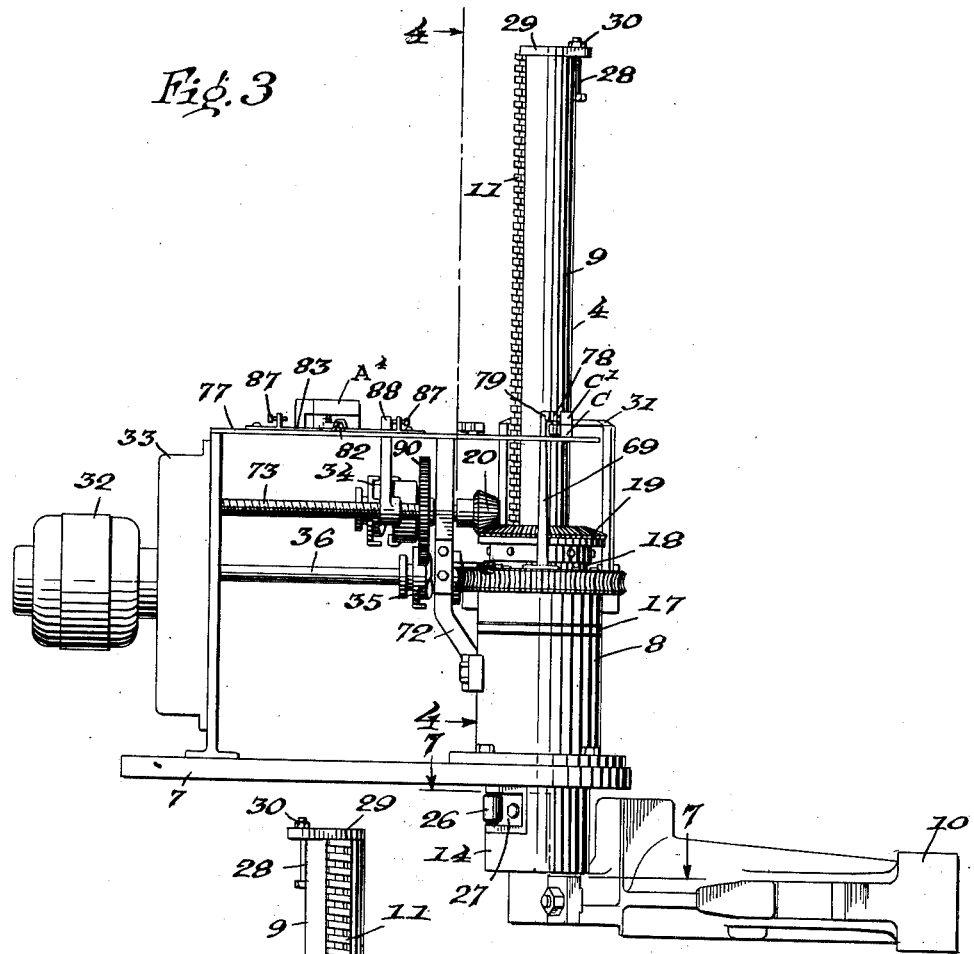
Figure 3 is a side elevational view of the discharger and its operating mechanism.
Figure 4:
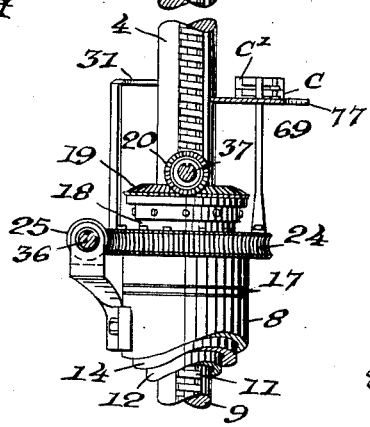
Figure 4 is a sectional view on line 4—4 of Figure 3, portions of the mechanism being broken away.
Figure 14:
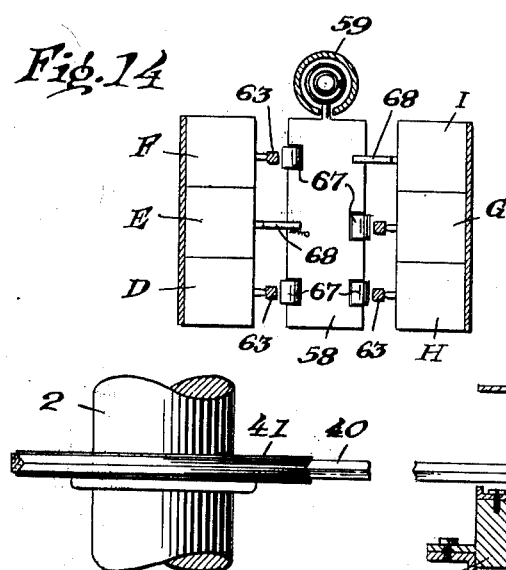
Figure 14 is a horizontal sectional view on line 14—14 of Figure 13 showing the switch devices which are responsive to movement of the governor shaft.
Figure 13:
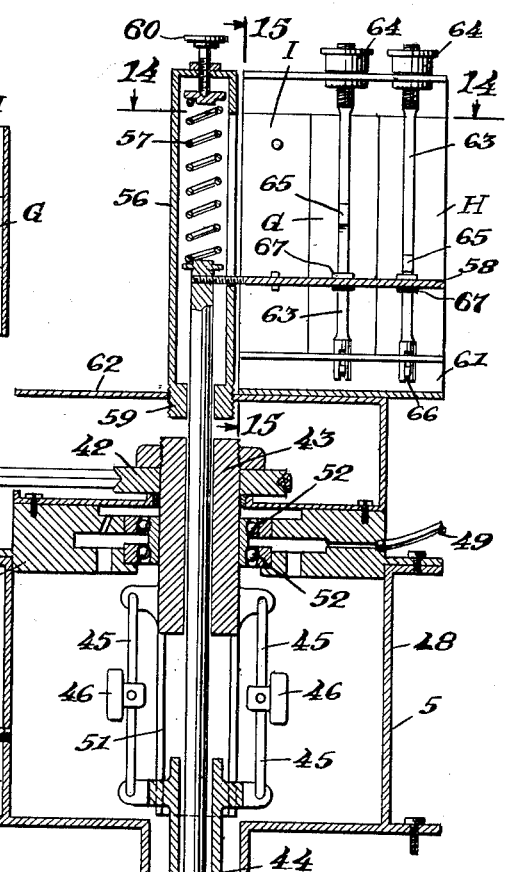
Figure 13 is a vertical section on line 13—13 of Figure 1, showing the governor and the switches controlled thereby, together with the means for driving the governor in synchronism with the basket of the machine.
Figure 15:
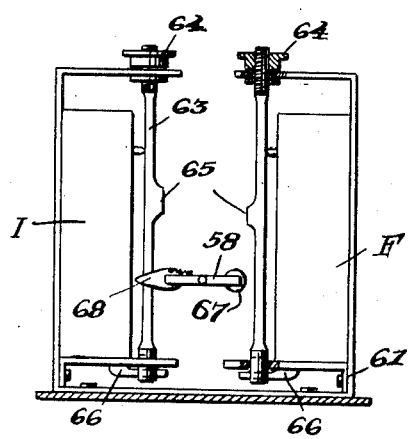
Figure 15 is a vertical sectional view on line 15—15 of Figure 13.
Figures 19, 20:
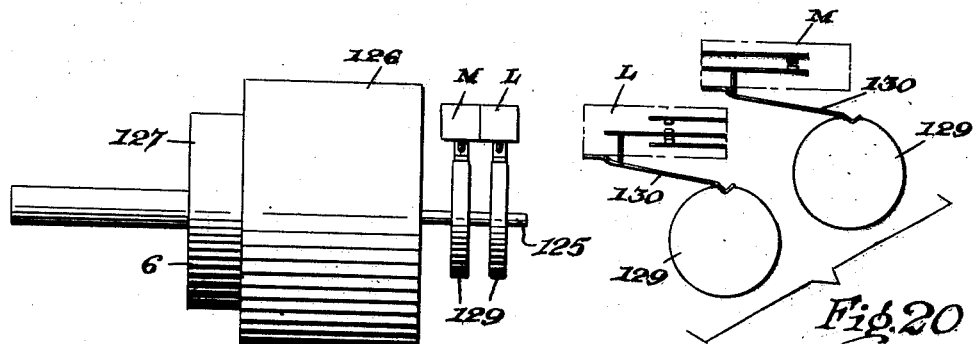
Figure 19 is a plan view of the timer for controlling the cycle of the apparatus.
Figure 20 is a diagrammatic view of the timer, its disks being shown in off position.

The upright finger member 69 carried by the worm gear 24 extends upwardly through a curved segmental slot 76 formed in a stationary plate 77, the slot being concentric with the worm gear and being of a length corresponding to the movements of the worm gear. Mounted upon the plate 77, in position to be operated by the upright finger 69 as the worm gear approaches the end of its counter-clockwise motion in moving the plow 10 towards the center of the basket 1, are two switches C and $C^1$ arranged one above another, $C^1$ being uppermost, see Figures 22, 25 and 26. These switches are operated by the upright member 69 carried by the worm gear through the intervention of leaf springs or levers 78 which are mounted on the plate 77 in horizontal alinement with their respective switches, each of said leaf springs preferably being movable into engagement with a switch pin carried by the cooperating switch. As shown in Figures 3 and 25, the upright finger or switch controlling member 69 is formed at its upper end with an overhanging head portion 79 which is adapted to actuate member 78 for operating the switch $C^1$ before the body of the finger member below said head portion operates the switch C through the leaf 78 cooperating therewith. It is a matter of importance that upon approaching the switches $C^1$ and C the finger 69 should first open $C^1$ and then reverse C for if C were reversed before $C^1$ was opened the movement of the upright finger member 69 toward $C^1$ would be stopped and upward movement of the plow 10 would be started, leaving the switch $C^1$ still closed. The result would be that the discharger 4 would fail to come to rest at the end of its cycle with the plow 10 at the top of its travel but would repeat its cycle of operation.

As previously explained and as shown in Figure 28, the main control circuit of the discharger receives power through switches G and H both of which must be closed before the discharger will operate. It will also be noted that with these switches closed, the discharger circuit is still open in the discharger itself when it is at rest. With the switches G and H closed, the circuit is complete to the common side of switches $C^1$ and P in the discharger and it is also complete to switch E in the governor. The governor at cutting speed closes switch E momentarily and current flows through switch A to the solenoid 93 of the discharger motor switch $A^1$, closing that switch and starting motor 32, and through switch B to clutch 35. Part 69 then moves away from switch $C^1$ permitting it to close. The circuit is then complete through switches E and $C^1$. Since switch E is only momentarily closed, to start the operation it opens and switch $C^1$ is then relied upon to keep the circuit closed.

Switch $C^1$ which is a single pole snap action switch is held open by the head portion 79 of finger 69 in the at rest position. When the discharger starts to operate, switch E is closed only until finger 69 moves away from switch $C^1$, thereby permitting switch $C^1$ to assume its normally closed position. As heretofore explained, the function of switch E sets the discharger in motion when the centrifugal has decelerated to discharging speed. As shown in the wiring diagram, this switch and the governor controlled switch E, as well as the switch P, are all in parallel and the closing of any one of them will start the discharger. In addition to the mechanical structure heretofore described, the discharger unit with its internal circuits consists of a driving motor 32 and switches A, $A^4$, P, C, $C^1$, $C^2$, $C^3$, B and O and it is connected by a cable to a control panel (not shown) on which is preferably mounted the motor reversing switch $A^1$ with its solenoids 92 and 93 and switches $A^2$ and $A^3$. The power circuit for the motor is 3 phase 440 volts—60 cycle and is connected through reversing switch $A^1$ to the motor 32 by means of the above mentioned cable.

As previously explained, one side of the circuit through which energy flows to operate the solenoids of the reversing switch $A^1$ and the solenoids of clutches 34 and 35 is brought to the common side of switches E, $C^1$ and P which function in the following manner: The speed of the basket 1 having dropped to approximately 60 revolutions per minute, the governor closes switch E momentarily. Current then flows through switch A to solenoid 93 closing the motor switch and through switch B energizing clutch 35. The member 69 moves away from switch $C^1$ which closes and keeps the circuit energized. When 69 reaches switch B, this switch is reversed braking the circuit to the clutch solenoid 35 and completing it to clutch solenoid 34. This starts the downward movement of the plow. At the end of the downward movement, the traveller 88 has moved sufficiently far along threaded member 73 to cause switch A to open and switch $A^4$ to close. The circuit through the switch solenoid 93 is broken and the circuit through solenoid 92 is then established, thus reversing the motor 32. Switch P is closed but it has no immediate effect since switch $C^1$ is still closed. Switch $C^2$ is likewise closed and it is to be noted from Figure 28 that current can flow to clutch solenoid 35 through either switches B or C. At this point in the discharging cycle, current flows through switch $A^2$ and switch C, the circuit through switches $A^3$ and B having been broken by the reversing of $A^1$. As the plow moves away from the screen, member 69 again approaches switches C and $C^1$. It first opens switch $C^1$ and then reverses switch C thereby breaking the circuit to clutch 35 and establishing the circuits to clutch 34. At this point, the internal circuit of the discharger would be broken were it not that switch P was closed when the motor reversed. Switch P keeps the circuit established until the upward movement of the discharger is completed, at which time the traveller 88 returns to its starting position opening switches P, $C^2$ and $A^4$ and closing switch A. The switches are again in the at rest position shown in Figure 28. No current can flow in the discharger circuit since these three switches E, $C^1$ and P are all open. It cannot again go through its cycle until switch E is again closed by the governor at the end of the next drying cycle. It will be noted that switch $C^2$ plays no part in the operation. It is in series with switch $C^3$ across the side of switch B which is open while member 69 is moving toward switches C and $C^1$. With $C^3$ open, no current can flow to clutch 34 until member 69 reverses switch C. Thus clutch 35 is first energized, causing the plow to move away from the wall of the basket and subsequently clutch 34 is energized causing the plow to rise. However, if switches $C^3$ is closed so that current will flow to both clutches 34 and 35 when $C^2$ is closed by the traveller, the plow will move out and up at the same time. The switch P prevents the plow 10 of the discharger from stopping after it has moved away from the screen and is ready to rise, for in this position of the plow the upright finger 69 mounted on the worm gear 24 has opened the switch $C^1$, and the discharger circuit would thus be broken were it not that it is held closed by the switch P until the discharger plow 10 returns to its starting position, when the circuit is opened by the opening of switches P and $A^4$.

The switch C is a single pole double throw snap action switch. When through the operation of a standard magnetic reversing switch $A^1$ the discharger motor 32 reverses it receives energy through the hold-in switch $A^2$ of the reversing switch, applying the energy to the worm clutch 35. When the upright switch operating member 69 carried by the worm gear 24 reverses the switch C it applies energy to the pinion clutch 34. In the rest position of the discharger mechanism 4, as shown in the wiring diagram, it is not energized since the switch $A^2$ is then open. The solenoid coils of the reversing switch $A^1$ which respectively correspond to the hold-in switches $A^2$ and $A^3$ are indicated at 92 and 93 in the wiring diagram.

Secured to the mounting plate 77 at the end of the curved slot 76 approached by the switch controlling finger member 69 when the worm gear 24 moves clockwise is a single pole double throw snap action switch B which, as in the case of the switches $C^1$ and C, is operated by the finger member 69 through the intervention of a spring leaf member 78. In the position shown in the wiring diagram the circuit through B is closed to the solenoid operated clutch 35 of the worm shaft 36. When the governor controlled switch E is momentarily closed the worm gear 24 moves the upright finger 69 away from the switch $C^1$, allowing the later to close and thus holding this clutch circuit closed after switch E has opened.

Mounted upon an upwardly extending portion 80 of the plate 77, as by means of bolts 81, are four snap action switches A, $A^4$, P and $C^2$ whose operating pins or plungers project downwardly in position to be engaged and actuated by a tapered ridge or raised cam portion 82 formed on a plate 83 that is slidably mounted on the fixed plate 77, the slidable plate 83 preferably being provided with aligned slots 84 which receive screws 85 having threaded engagement with said plate 77. The plate 83 is formed with spaced brackets 86 which project laterally beyond said plate and upon the outer ends of which adjusting screws 87 are respectively mounted. In the wiring diagram corresponding to the rest position of the apparatus, switch A is closed and switches $A^4$, P and $C^2$ are open.

Movement of the slide 83 with respect to the underlying mounting plate 77 is effected by means of a traveller 88 which is mounted upon the threaded timer shaft 73 of the discharger, the timer shaft being driven from the bevel pinion shaft 37 by means of a gear 89 mounted thereon which meshes with the gear 90 carried by the said shaft 73. These gears may advantageously have a ratio of 1 to 3. As well shown in Figs. 22 and 27, the traveller 88 projects upwardly through a slot 91 in the mounting plate 77 so as to be capable of engaging the adjustable screws 87 to thereby shift the slide 83 back and forth in accordance with the direction of movement of the traveller. The timer shaft 73 may advantageously have twenty threads per inch so as to limit the movement of the traveller to but slightly more than three inches.

The switches A and $A^4$ control the rotation of the discharger motor, A being of the normally open type, and $A^4$ of the type that is normally closed. In the position shown on the wiring diagram, the normally open switch A is closed and the normally closed switch $A^4$ is open. In this position the discharger 4 is in the rest position with the plow 10 at the top of the basket 1. When the speed of the centrifugal basket has decreased to cutting speed, the momentary closing of the governor controlled switch E causes the upright switch operating finger 69 carried by the worm gear 24 to move clockwise until the switch C is reversed and $C^1$ is afterwards closed, thereby completing the circuit through switch A to switch solenoid 93 and through the switches $A^3$ and B to the worm clutch 35. The discharger control circuit thus being held closed by the switch $C^1$, the discharger 4 operates to turn the plow toward the screen of the basket 1. When the finger member 69 reaches switch B that switch is reversed, breaking the circuit of the worm clutch which releases, and closing the circuit of the pinion shaft clutch 34 through the switches $A^2$ and B. The plow 10 of the discharger then starts to move downwardly. When the plow has reached the bottom of the centrifugal basket 1, the traveller 88 driven by the discharger timer shaft 73 has moved far enough to reverse switches A, $A^4$ and P, opening A and closing $A^4$ and P, thereby de-energizing solenoid 93 and opening switch $A^3$, energizing solenoid 92 and closing switch $A^2$. The motor driving the discharger 4 reverses. Current is now flowing to the solenoid 92 and through switch $A^2$ to the center contact of the switch C. Since the upright finger 69 which is movable with the worm gear 24 now occupies a position at the extreme left of the slot 76 in the plate 77 through which it projects, the worm clutch side of the switch C is closed, thus enabling the clutch 35 to drive the worm 24 and thereby rotating the worm gear 24 counterclockwise. This causes the plow 10 to move away from the screen and toward the center of the basket 1. As this movement of the worm gear 24 continues, the switch operating finger 69 approaches the switches C and $C^1$, first opening $C^1$ and then reversing C. In reversing C, the circuit to the worm clutch 35 is broken and the circuit of the pinion clutch 34 is closed. Thereupon the bevel pinion 29 rotates and the plow 10 rises.

The switch $C^2$, which is mounted upon the plate 77 along with the switches $A^4$, A and P so as to be operated by the reversing mechanism slide 83, may be omitted, if desired, in which case the hand switch $C^3$ by which $C^2$ is cut in or out of the circuit will also be omitted. Providing the mechanism with the switches $C^2$ and $C^3$ makes it possible to combine, at will, the rotational movement of the plow 10 away from the screen of the centrifugal basket 1 when the plow is at the bottom of its travel and the subsequent upward movement of the plow so that these movements of the plow, instead of being separately performed in response to the operation of the switches A, $A^4$ and P by the reversing slide 83, may be caused to occur simultaneously, thus reducing the time required for the plow to return to its original elevated position. When the hand switch $C^3$ in the circuit of switch $C^2$ is open, these movements of the plow 10 are performed separately, as heretofore described. With the switch $C^3$ closed, the switch C² is closed by the slide 83 when the plow reaches the bottom of the basket 1 and the discharger motor is reversed, thereby energizing the clutch 34 and causing the bevel pinion 20 to rotate so as to effect upward travel of the plow 10 simultaneously with the rotation of the worm gear 24 in effecting withdrawal of the plow from the screen wall of the basket 1. When operating on heavy or viscous material which may pile up in the bottom of the basket, it is preferred to perform these operations successively; when the material is dry and granular the two operations are preferably performed simultaneously.

In addition to controlling the operation of the switches A, A⁴, P and C², the traveller 88 also serves to operate a normally open single pole single throw snap action switch O which is in parallel with switch M in the timer motor circuit, switch O being closed upon movement of the traveller to the right as the plow 10 rises, but being unaffected and remaining open when the traveller moves toward the left. This result is preferably accomplished by interposing between the traveller and the switch O a hinged lever 94 which upon being forced upwardly causes the switch to close; and by providing the traveller 88 at its upper end with a laterally projecting rod or shaft 95 carrying a pivoted dog 96 which is positioned beneath and is adapted to actuate the lever. The dog is free to rotate when the traveller 88 moves to the left but is held against rotation when the traveller moves to the right by its lower end coming into engagement with the stationary mounting plate 77; and said dog is weighted at its lower end so that whenever it is free to do so, it automatically assumes a position adapting it to actuate the switch operating lever 94.

The lever 94 is adjustable longitudinally with respect to the slotted plate 77 through which the traveller 88 projects to thereby permit the lever to operate with substantial exactness in the proper timed relation to the traveller on the timer shaft 73 of the discharger. For this purpose, the lever 94 may advantageously be hinged, as at 97, to a plate member 98 having a slot which receives a headed screw 99 having threaded engagement with the stationary mounting plate 77, the member 98 thus being adapted to be clamped to the plate 77 so as to hold the lever in any adjusted position desired. The switch O is preferably mounted on the adjustable plate 77 by providing said plate at one side with an upright bracket 100 which extends behind the switch O and to which the switch is bolted. In this manner the proper operating position of the switch O with respect to the hinged lever 94 by which it is operated is maintained in any position of adjustment of the lever.

At its free end the lever 94 is provided with a downwardly extending flange or leg 101 which serves to limit the downward swinging movement of the lever by engaging the upper surface of the stationary mounting plate 77; and between its ends said lever is formed with a depressed portion 102 with the under face of which the dog 96 cooperates to cause the lever 94 to be lifted, as heretofore explained. The depressed portion 102 is of a length just sufficient to hold the timer motor circuit closed until the timer itself closes the switch M controlled thereby. For the treatment of low grade sugar, a length of this depressed portion which results in holding the timer motor circuit closed for about twenty seconds will be found ample even when the timer disc which controls the switch M is turning as slowly as one revolution in fifty minutes. Where the machine is adapted to commercial or refined sugar the entire discharged cycle takes only about thirty seconds and accordingly the depressed portion 102 would be of suitable length to close switch O only momentarily.

The mixer 103 from which the material to be operated upon is delivered to the centrifugal basket 1 may be of any usual or desired form. As illustrated in Fig. 21 it is of the well known type employing a gate 104 controlling the admission of material to the basket, said gate being slidably mounted on the mixer and being operated by a double acting hydraulic cylinder 105 whose piston is connected to a pivoted lever 106 which is movably connected to the gate by the link 107. When water is admitted to the cylinder 105 through the pipe 108 the gate opens; when water is admitted through the pipe 109 the gate closes.

To obtain even filling of the centrifugal basket, its shaft 2 may be provided, as is common practice, with a distributor disc 110 which is spaced upwardly from the bottom of the basket and is conveniently formed in two sections clamped around the shaft. To avoid the possibility of the discharger shaft 9 eventually becoming gummed up and sticking because of material thrown against it from the distributor disc 110, it is preferred to encircle the shaft 2 with a generally cylindrical stationary shield 111 through which the material coming from the mixer 103 passes to the upper surface of the disc. This shield is provided with a trough portion 112 positioned so as to receive the material as it is discharged from the mixer 103. The lower end of the combined shield and filling member 111 is spaced upwardly from the distributor disc 110, a distance of about three inches being effective for the purpose in the machine shown, and the diameter of its lower end is preferably somewhat less than the diameter of the disc. Any suitable means may be employed for mounting the shield 111 upon the curb or casing 3 of the machine, as for example by means of screws which (see Fig. 21) pass through the trough portion 112 of the shield and have threaded engagement with the flange at the top of said curb.

The charging of material into the centrifugal basket 1 is controlled by the governor 5. When the machine starts and as the basket picks up speed the bar 58 of the governor rises and the switch H, which the governor holds open at all points below cutting speed, is allowed to close. As the speed of the centrifugal basket 1 continues to increase it reaches the predetermined filling speed and thereupon the governor bar 58 closes the switch I and current then flows through the switch K to energize the solenoid magnet 113 for applying the power to open the gate 104. The switch K which is mounted within a bracket or housing 114 secured to the curb or casing 3, is a single pole double throw switch whose center contact is closed to the opening side of the gate circuit, that is to the coil of the solenoid magnet 113. It will be noted from Figure 28 that the center contact of switch K is connected through switch I in the governor to one side of the supply line. Across the two sides of this two-way switch are connected solenoids 113 and 115 whose common connection is the return to the other side of the supply line. In Figure 28, the basket is empty and the side of switch K leading to the gate opening solenoid 113 is closed. However, no current can flow since switch I in the governor is open. At a speed of the basket suitable for charging, the governor momentarily closes switch I completing the circuit to solenoid 113 which applies power for opening the gate.

Since switch I is only closed momentarily, it is obvious that some means must be provided to keep the circuit closed to the center member of switch K after the opening of switch I, otherwise no current would be available for closing the gate. This is accomplished by the use of switch J which is mounted in such position that it is closed by the opening of the gate. As the charge builds up on the basket wall, the lever 118 is pushed outward until the cam 120 reverses the switch K, de-energizing the solenoid magnet 113 and energizing the solenoid magnet 115, thus permitting the gate opening valve 117 to close and opening the valve 116 to supply power for closing the gate 104. The lever arm 118 is preset to reverse switch K when the charge is approximately one inch from the basket rim. It may be adjusted by rotation of cam 120 on shaft 119. In the form of the invention chosen for the purpose of illustration, the power for actuating the gate 104 is high pressure water which is supplied to and released from the hydraulic cylinder through three-way valves 116 and 117 which are operated by their respective solenoid magnets 113 and 115 and respectively communicate with the pipes 108 and 109 of the hydraulic cylinder 105. But it is to be understood that whatever form of power is employed for operating the gate 104 the solenoid magnets 113 and 115 are the means of its application.

As the governor actuated switch I is closed for only a brief interval and opens before the operation of charging the basket is completed, it is necessary to provide means for keeping the gate opening circuit energized until the basket is fully charged. This is accomplished by a mercury switch J which is in parallel with the switch I and is so mounted upon the gate operating lever 106 adjacent the pivotal point thereof that it is open when the gate 104 is closed and closes immediately the gate starts to open. The gate opening circuit is thus held closed by the switch J after I has opened and until the filling operation is completed.

Figure 18:
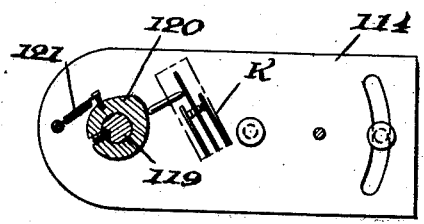
Figure 18 is a detail sectional view on line 18—18 of Figure 17.
Figure 16:
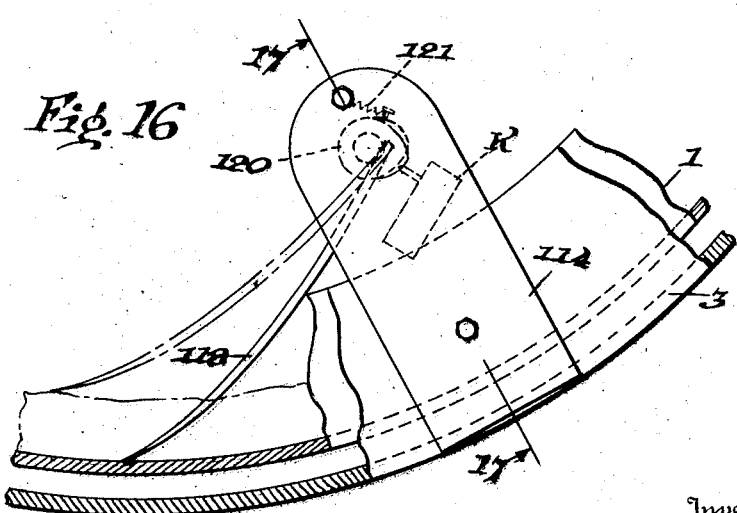
Figure 16 is a view, partly in plan and partly in section, showing the mechanism for controlling the closing operation of the filling gate and its relation to the curb and basket of the machine.

The reversal of the switch K to energize the solenoid 115 so as to effect a closing of the gate 104 when the centrifugal basket 1 has been filled to the desired extent may be conveniently accomplished by means of a lever 118 which (see Figs. 16, 17 and 18) is rigidly mounted on the lower end of a rotatable shaft 119 to the upper end of which a cam 120 is firmly affixed by means of a set screw or in other suitable manner. A spring 121 which is operatively interposed between the cam and the housing member 114 constantly tends to swing the pivoted lever 118 toward the screen wall of the basket 1 and to turn the cam 120 to a position in which the center contact of the switch K is closed to the solenoid 113 in the opening side of the gate circuit. As the charge flowing from the gate through the shield 111 to the rotating distributor disc 110 builds up against the screen wall of the basket 1, it pushes the lever 118 inwardly away from the basket wall, thereby rotating the shaft 119 and the cam 120 secured thereto. When the basket has been filled to the desired extent, the turning movement of the cam has proceeded sufficiently far to operate the switch K, causing it to reverse, whereupon the gate 104 closes, as heretofore explained. As the gate reaches its fully closed position, the switch J carried by the gate operating lever 106 opens, thus de-energizing the gate operating circuit, and as the governor actuated switch I has already opened the filling operation will not repeat.

The shaft 119 upon the lower end of which the lever 118 is mounted extends through and is supported against lateral thrust by a bushing or tubular bearing sleeve 122 which projects downwardly from the bracket casing 114 within which the switch K and the cam 120 are housed, the upper end of said sleeve being rigidly secured to the lower wall of said casing by welding or in other convenient manner. This sleeve extends in spaced concentric relation downwardly into a cylindrical shell 123 which is closed at its lower end by being welded to the shaft 119 to thus constitute a reservoir for containing oil to lubricate said shaft and to protect the bearing sleeve 122 from foreign material.

To provide for the possibility of power failure of the motor driving the machine or group of machines, as the case may be, while the discharger 4 is operating or while the centrifugal basket 1 is being loaded, the apparatus is provided with means for instantly stopping either of said operations upon such power failure, said means preferably comprising a solenoid magnet 124 and mercoid switches R and S controlled thereby, the energy for the solenoid magnet being taken from the 110 volt line before the control circuit switch V through switch Q, which may be any kind of a single pole single throw switch and which opens and closes with the circuit breaker supplying power to the machine or group of machines. The switch R is a double end mercury switch and, in the running position shown in the wiring diagram, the opening side of the gate circuit is made through it. The switch S is a single end mercury switch and is in the line supplying power to the discharger control circuit. When the circuit breaker is closed, power flows from the 110 volt line through the switch Q and through switch W (if the latter be used) to the solenoid 124, which thus holds the switches R and S in their running positions. If the circuit breaker should open, consequently causing switch Q to open, the solenoid 124 would be de-energized, thereby reversing switch R and opening switch S. Upon the reversal of switch R, the opening side of the gate opening circuit is broken and the closing side of the gate circuit is closed, thus energizing the solenoid 115 and causing the gate 104 to close. Should the discharger 4 be in operation when the opening of the circuit breaker causes switch S to open, the discharger will stop until power is restored. Switch W is an ordinary light switch which opens the circuit to the solenoid magnet 124 when the particular machine with which said magnet is associated is shut down. Switch W, of which one is provided for each machine, is not essential, but is merely a convenience and hence may be omitted. The switches Q, R and S, all of which are solely concerned with automatically stopping the machine in the event of an accidental power failure, are preferably employed since they operate to eliminate all disastrous consequences attendant upon an emergency failure of power, but they may be omitted, if desired, although at considerable risk.

Means are preferably provided for testing out the machine without filling the basket 1 and also for testing the discharger 4 while the basket is at rest. For the former of these purposes an ordinary tumbler light switch T, which is normaly closed may advantageously be inserted in the circuit by which opening of the filling gate 104 is effected. When the switch T is opened, the machine will go through its cycle without the basket 1 being charged with material from the mixer 102. To enable the discharger 4 to perform its operating cycle while the basket 1 is at rest, so that the positions of switches A, A⁴ and P may be correctly set or adjusted while the discharger is in motion, an ordinary tumbler light switch U is preferably employed. This switch U is normally open but, as shown in the wiring diagram, its closing causes the discharger 4 to repeatedly perform its cycle until U is opened.

The timer 6 may be of any suitable form providing a variable speed shaft 125 capable of being selectively caused to rotate at different predetermined speeds. Instead of employing a low voltage synchronous clock motor and associated transformer and speed changing gearing suitable for this purpose, it is preferred to employ, as diagrammatically illustrated in the drawings, a program switch 126 for 110–115 volts of any well known form affording the desired range of speed of its shaft 125, such, for example, as a variable speed timer whose motor 127 is directly supplied with 110 volt current from the power line. Where, as in the present instance, the machine is adapted for operating on low grade sugar, speeds of 5, 30, 40 and 50 minutes per revolution for the shaft 125 will usually be found satisfactory, the lowest speed being employed only when the machine is being tested. For commercial or refined sugar a timer speed varying from 2 M. P. R. to 5 M. P. R. will usually be found satisfactory.

Mounted upon the timer shaft 125 are a pair of fiber discs or cams 129 which respectively control the operation of the switches L and M. For that purpose, each disc is provided on its periphery with a wedge-shaped notch or cam recess for receiving a corresponding projection with which the respective operating arms or levers 130 of the switches L and M are provided at their outer ends.

The switch L is a single pole double throw snap action switch through which power is supplied either to the solenoid 131 of the power circuit, to thereby drive the centrifugal basket 1, or to the solenoid 132 of the brake circuit to thereby actuate the brakes by which the speed of rotation of the basket is reduced whenever required during the operation of the machine. In the wiring diagram the switch L is shown in the position it occupies at the end of the cycle of operation of the machine and delivers power to the brake circuit through the governor controlled switch F, thus keeping the brake applied until the speed of the basket 1 has dropped to cutting speed, at which time the governor opens switch F to thereby break the circuit and release the brake. In the position it assumes when the projection upon its operating lever 130 is forced out of the notch in its operating disc 129 it energizes the power circuit containing the solenoid 131 by which application of driving power to the basket 1 is controlled, this half of the switch L at such time being in parallel with the switch D, which is opened and closed by the governor as may be required during the operation of the machine in order to maintain a reasonably constant speed of the basket 1 during the cutting operation.

The switch M is a single pole single throw snap action switch, normally open, which is in series with the timer motor 127. In the wiring diagram, it is shown in the position it occupies at the end of the cycle of the machine. During the running cycle it is held closed as the projection on the outer end of its switch operating lever 130 then is in contact with the circular portion of the periphery of the timer disc 129 by which the movement of said lever is controlled. Upon the completion of one revolution of this timer disc, the projection on the end of the lever moves into the notch on the periphery of the disc, whereupon the switch M opens and the timer motor stops.

The mechanism (not shown) by which power is applied to cause the basket 1 to rotate when the solenoid 131 of the power circuit is energized may be of any form commonly used or suitable for the purpose; and the braking mechanism (not shown) by which the brakes are applied to the basket when the solenoid 132 of the brake circuit is energized may likewise be of any usual or suitable form. In the apparatus chosen for the purpose of explaining my invention hydraulic means are employed for driving the centrifugal basket 1 and for applying the brakes to the basket and consequently the respective solenoids 131 and 132 form parts of solenoid valves which may be of any suitable type, such, for example, as mercoid solenoid valves. When the solenoid 131 is energized, and if hydraulic power is employed, the valve controlled by said solenoid opens and supplies water to the usual hydraulic cylinder of the needle valve of the water motor, thereby bringing the motor in operation and effecting the rotation of the basket 1. When the solenoid 132 is energized, and if hydraulic power is used to apply the brakes, the valve controlled by this solenoid opens to supply water to the braking cylinder and thus apply the brakes. When the solenoid 132 is de-energized and its valve closes the hydraulic cylinder is vented through a small leak-off opening in the supply line to the brake cylinder.

It will be understood, of course, that whatever form of power be employed the solenoid 131 is the means for causing it to drive the basket 1, and that the solenoid 132 is the means of applying the brake. In a machine driven by electric motor the solenoid 131 would be the solenoid of the magentic switch controlling the operation of the motor; in a fluid driven machine it would be the solenoid of a solenoid valve admitting oil to the coupling; in a belt or gear driven machine the solenoid 131 would control the magnetic clutch, if such is used, or would act as a pilot to induce action of the clutch operating mechanism (hydraulic cylinder, thrustor, etc.) of other forms of clutches which might be employed. Similarly, it is to be understood that the power for the brakes whose application is controlled by the solenoid 132 may be water, electricity, oil or air, applied in the usual ways.

The machines may obviously be employed in groups, provision therefor being indicated at 133 in the wiring diagram; and it is also obvious that if the individual timers 6 of the respective machines are of low voltage current for operating them may be supplied from a single transformer.

The machine operates in the following manner. With the main power supply on, the switch W is closed and thereupon the switches R and S, which act only in the emergency of power failure as heretofore explained, assume the positions shown in the wiring diagram. To start the machine, it is only necessary to close the switch V which energizes the control circuit, for the machine is always stopped following discharging and before it recharges and, therefore, the switch O has already performed its function of starting the timer motor 127 so as to rotate the timer discs 129 and close switch M and the power side of switch L. Upon the closing of the power side of switch L, the solenoid 131 is energized and the basket 1 is caused to rotate by the hydraulic power or other driving means provided for that purpose. In the present instance the solenoid opens the valve controlling the operation of a hydraulic motor for driving the basket.

As the basket picks up speed, the switch operating bar 58 of the governor 5 rises and switch H, which the governor holds open at all speeds of the basket below cutting speed, is allowed to close. When the speed of the basket reaches the predetermined filling speed the bar 58 closes switch I and current flows therethrough and through the gate opening side of switch K, thus energizing the solenoid 113 of the solenoid valve 117 to cause said valve to open and supply water to the lower end of the hydraulic cylinder 105, thereby opening the gate 104. As the gate makes the initial opening movement resulting from the closing of switch I, the switch J is closed by the movement of the pivoted gate operating lever 105. The closing of switch J bypasses switch I and, therefore, the gate 104 remains open until the operation of filling the centrifugal basket 1 is completed, notwithstanding that switch I operates only momentarily to start the filling operation.

Upon the gate 104 being opened material from the mixer 103 flows through the shield member 111 onto the distributing disc 110 which throws it by centrifugal force against the screen wall of the basket 1. As the charge builds up, it pushes inwardly against the pivoted lever 118, thereby turning the cam 120 at the upper end of the shaft 119 upon which the lever is mounted. When the basket has filled to the desired extent the cam 120 reverses the switch K, thereby energizing the solenoid 115 to cause the gate closing valve 116 to open and simultaneously de-energize the solenoid 113 to cause the gate opening valve 117 to close and thus causing the gate 104 to close. When the gate is finally closed the switch J opens, thus de-energizing the gate operating circuit, and as switch I has already opened the filling operation will not repeat.

When the basket 1 is filled it continues to accelerate until it reaches its top speed, running at this speed until the timer discs 129 have made one revolution, whereupon the wedge shaped projections on the levers 130 for operating the switches L and M enter the respectively appropriate notches of said discs and switches L and M are operated, switch M opening to break the timer circuit and stop the operation of the timer 6 and switch L opening the power circuit containing solenoid 131 and closing the brake circuit containing the solenoid 132, the braking circuit being completed through switch F of the governor. The energizing of the solenoid 132 causes braking power to be applied to the basket 1, as heretofore explained. As soon as the brake is on the basket begins to decelerate. When its speed becomes less than that corresponding to the uppermost position of the vertically movable rod 47 of the governor, the switch actuating bar 58 mounted on said rod starts to move downwardly. Just above the point at which the basket 1 reaches the speed to be used for the discharging operation, the bar 58 momentarily closes switch E to thereby close the discharger control circuit. The closing of switch E completes the circuit through switch A to switch solenoid 93 and through switches $A^1$ and B, to the starting motor 32 and clutch 35, respectively, thus actuating the solenoid clutch 35 to drive the worm 25 and cause the worm gear 24 of the discharger to rotate in a clockwise direction. As the worm starts to rotate in response to the brief closing of the switch E, the switch operating finger member 69 which is mounted on the worm gear moves to the left, allowing switch C to reverse and switch $C^1$ then to close. The switch $C^1$ then holds the discharger control circuit closed and no energy is flowing through switch C since the hold-in switch $A^2$ is open. The clockwise rotation of the worm gear 24 causes the plow 10 of the discharger to swing or turn outwardly toward the screen wall of the basket 1. When the worm gear 24 has turned clockwise sufficiently far to bring the tip of the plow to the wall of the basket, the upright finger 69 carried by the worm gear reaches and reverses the switch B, breaking the circuit to the solenoid clutch 35 through which the worm gear is driven and closing the circuit to the solenoid clutch 34 through which the bevel pinion 20 is driven. The clutch 35 thus releases and the clockwise rotation of the worm gear thereupon ceases, while the energizing of clutch 34 results in causing the bevel pinion 20 to turn the bevel gear 19 of the discharger and start the plow 10 downwardly toward the bottom of the basket 1. As the downward travel of the plow proceeds the attendant rotation of the timer shaft 73 of the discharger shifts the traveller 88 toward the left; and when the plow reaches the bottom of the basket the traveller has moved sufficiently far to open switch A, close switch $A^4$, open switch P and close switch $C^2$. The opening of switch A deenergizes the solenoid 93 of the reversing switch $A^1$ and opens the hold-in switch $A^3$, while the closing of switch $A^4$ energizes the solenoid 92 of the reversing switch and closes switch $A^2$. The motor 32 driving the discharger 4 is thus reversed. Current is then flowing to the solenoid 92 and through the hold-in switch $A^2$ to the center contact of switch C. Since the upright finger 69 carried by the worm gear is now at the extreme left hand end of its travel, the side of switch C which is in circuit with the solenoid clutch 35 is closed and said clutch, acting through the worm 25, turns the worm gear 24 counter-clockwise, thereby rotating the plow 10 inwardly away from the screen of the basket 1. This rotation of the worm gear 24 causes the upright finger 69 carried by it to approach the switches C and $C^1$, first opening switch $C^1$ and then reversing switch C. By the reversal of switch C the circuit to the worm actuating clutch 35 is broken and the circuit of the pinion clutch 34 is closed, thereby halting the inward turning movement of the plow 10 and causing it to move upwardly. Although switch $C^1$ is open at this time the discharger control circuit is held closed through switch P, which was previously closed by the traveller 88 when reversing switches A, $A^4$ and P. When the plow 10 reaches the top of its travel the traveller 88 has moved back to the right and switches A, $A^4$ and P (and also switch $C^2$, if it be employed) resume their positions shown in the wiring diagram. The opening of switch P stops the discharger 4 and it will not repeat its operations until the next cycle of the machine, when switch E is again closed by the bar 58 of the governor.

Figure 28 discloses the presence of all of the electrical parts described and the circuits by which they are electrically interconnected.

Because of the resistance incident to cutting the sugar material from the centrifugal basket, power must be applied during the cutting operation to prevent the basket from stopping. The application of this power is effected by switch D which parallels the power side of switch L controlled by the timer 6. When the speed of the basket falls below the predetermined cutting speed the switch actuating bar 58 of the governor moves downwardly, closing switch D and thereby applying power to the centrifugal basket, which then immediately picks up speed. When cutting speed is regained switch D opens, only to close again a second or so later as the speed of the basket decreases, the response of the governor 5 to changes of speed of the basket being so rapid that switch D is constantly opening and closing. By thus applying power to jog the centrifugal basket a substantially smooth and uniform cutting speed is maintained through the cutting operation.

If, as a result of the material operated on being heavy and difficult to discharge, the speed of the basket should fall below the point at which switch D closes the governor controlled switch H opens. Being in the discharger control circuit, the opening of switch H stops the discharger 4, thus relieving the basket of the resistance due to the operation of the discharger and permitting the basket to pick up speed quickly. In free cutting material the discharger will not hesitate, but in heavy material difficult to discharge the discharger will stop frequently to enable the basket to gather speed. This provision against stalling in very heavy material, while advantageous and generally necessary in water driven machines, is not necessary in machines where ample torque is available at cutting speed and should not be required where the basket is driven through a clutch or a liquid coupling or torque converter.

When the plow 10 reaches the top following the completion of the cutting operation the switch O is then in closed position, having been closed by the traveller 88 towards the end of the upward movement of the plow. Since switch O, which holds for a short interval, is in parallel with switch M it closes the timer motor circuit and in that interval the timer disc 129 rotates far enough to close switch M, thus causing the machine to begin its next cycle.

What I claim is:

1. In a centrifugal machine having a rotatable basket formed with a screen peripheral wall and means for rotating the basket, the combination of timer mechanism electrically controlling rotation of said basket for a predetermined interval of time, governor mechanism actuated upon rotation of the basket and responsive to the speed thereof, means electrically associated with the basket rotating means and actuated by the governor mechanism for causing the operation of said basket rotating means upon expiration of the control thereof by said timer mechanism, a discharger controlled by said governor mechanism involving a plow positioned within said basket and mechanism for actuating said plow to move it up and down and also towards and away from the peripheral wall of the basket, means actuated by the governor for causing the plow of said discharger to move a predetermined distance towards the peripheral wall of said basket, means operable in response to a predetermined movement of the plow towards said peripheral wall for causing said plow to move downwardly, means operable in response to a predetermined travel of the plow during its downward movement for causing it to move away from said peripheral wall of the basket at the end of its downward movement, means operable in response to a predetermined movement of the plow away from said basket for causing the plow to effect an upward movement with respect to said basket to its normal at rest position, means actuated upon a predetermined travel of the plow upwardly for causing termination of its upward movement after it has risen a predetermined distance, and means electrically connected to said timer and acting in response to a predetermined upward movement of the plow for causing said timer mechanism to start operating again before termination of the upward movement of the plow.

2. In a centrifugal machine having a rotatable basket formed with a screen wall and means for rotating said basket, the combination of timer mechanism electrically controlling rotation of said basket for a predetermined interval of time, governor mechanism associated with said basket rotating means and actuated by rotation of the basket for causing continued operation of said basket upon expiration of the control thereof by said timer mechanism, means for controlling the charging of material into the basket, means electrically actuated by said governor mechanism for causing said charge controlling means to assume a position admitting a charge of material to the basket, means within the basket engageable with the material admitted to the basket for causing said charge controlling means to assume a position stopping the admission of material to the basket, discharger mechanism electrically controlled by said governor mechanism involving a plow positioned within said basket and switch means for actuating said plow to enable it to move down and up and also towards and away from said screen wall of the basket, and means coordinated with movement of the plow of the discharger mechanism and operable in consonance with a predetermined upward movement of the plow for causing said timer mechanism to come into operation before completion of the upward movement of the plow.

3. In a centrifugal machine having a rotatable screen basket and means for rotating the basket, the combination of timer mechanism electrically controlling rotation of said basket for a predetermined interval of time, governor mechanism associated with said basket rotating means and responsive to the speed of said basket and adapted upon expiration of the control of said basket by said timer mechanism to cause continued rotation of the basket, a discharger controlled by said governor involving a rotatable and vertically movable plow, means actuated by said governor mechanism for causing said plow to rotate towards said basket for a predetermined distance, a plurality of means coordinated with movement of the plow of the discharger and respectively responsive to predetermined movements thereof for controlling the operation of said plow subsequent to its rotation towards the basket, and means responsive to a predetermined movement of the plow of the discharger for stopping the operation of said discharger.

4. In a centrifugal machine having a rotatable basket and means for rotating the basket, the combination of timer mechanism electrically controlling rotation of the basket for a predetermined interval of time, governor mechanism responsive to the speed of the basket, means actuated by the governor mechanism upon expiration of the control of said basket by said timer mechanism to control further operation of said basket, charging means for controlling the admission of a charge of material to the basket, means electrically actuated by said governor mechanism at a predetermined speed of the basket for causing said charging means to assume a position for admitting material to the basket, means electrically operable in consonance with the quantity of material admitted to the basket for causing said charging means to assume a position stopping the admission of material to the basket while said timer mechanism continues to cause the operation of said means for rotating the basket, and plow means for discharging the material from the basket while said governor actuated mechanism effects the operation of said basket rotating means.

5. In a centrifugal machine having a rotatable basket, the combination of timer mechanism operating for a predetermined interval of time during rotation of the basket, governor mechanism responsive to the speed of the basket, means associated with said governor mechanism and acting upon the cessation of the timer mechanism to cause further rotation of the basket, means for charging the basket with the material to be operated upon, a discharger having a rotatable and vertically movable plow disposed within the basket and being provided with switch means for actuating the plow to cause it first to rotate towards the basket and then move downwardly and then return to the initial position from which it rotated towards the basket, means responsive to the governor for causing said discharger to rotate the plow towards the basket, and means coordinated with the movement of the plow of said discharger and acting responsively to a predetermined movement of the plow for causing the discharger to stop operating.

6. In a centrifugal machine having a rotatable basket and means for rotating the basket, the combination of timer mechanism electrically controlling rotation of said basket for a predetermined interval of time to cause the operation of said basket rotating means, governor mechanism actuated by the speed of the basket, means acting in consonance with a predetermined movement of the governor mechanism for causing the said means for rotating the basket to act upon expiration of the control of said basket by said timer mechanism, a discharger having a plow for freeing material operated upon from the basket, means electrically controlled by the governor mechanism for causing the discharger to remain at rest throughout the said interval wherein the timer mechanism causes the operation of said means for rotating the basket, and means electrically actuated by the governor mechanism for causing the operation of the plow of said discharger while said means for rotating the basket operates under control of said governor mechanism.

7. In a centrifugal machine having a rotatable basket and means for rotating the basket, the combination of timer mechanism electrically controlling rotation of said basket for a predetermined interval of time to cause said means to effect the rotation of the basket, governor mechanism responsive to the speed of the basket, means actuated by said governor mechanism and acting upon expiration of control of said basket by said timer mechanism for causing said basket rotating means to operate in alternation with the operation thereof effected by the timer mechanism, a discharger having a plow, electrical means for operating the plow of the discharger to cause delivery from the basket of material operated upon, and means electrically coordinated with said governor mechanism for initiating the operation of the plow of the discharger subsequent to the said interval of time during which said timer mechanism effects the operation of said means for rotating the basket.

8. In a centrifugal machine, the combination with a rotatable basket, of governor mechanism actuated by the speed of the basket, means electrically controlled by said governor for charging the basket with material to be operated upon, discharger mechanism having a plow operable to cause the discharge of material from the basket, reversible motor means for actuating the plow of said discharger mechanism, and means electrically responsive to the governor mechanism for initiating the operation of the plow of the discharger, said discharger mechanism involving a rotatable and vertically movable shaft provided with said plow on its lower end, said shaft having a series of interrupted threads arranged in alinement longitudinally of the shaft, a rotatable nut member having cooperative engagement with said threads, a bevel gear encircling said shaft and rigidly attached to the rotatable nut member, a bevel pinion operatively interposed between said motor means and the bevel gear and adapted to cause said gear and said nut member to rotate in either direction, a rotatable sleeve encircling said shaft and with respect to which the shaft is longitudinally slidable but fixed against relative rotation, a worm gear fixed with respect to said sleeve, and a rotatable worm operatively interposed between said motor means and the worm gear and adapted to cause said worm gear and said sleeve to rotate in either direction to thereby effect a corresponding rotation of said shaft.

9. In a centrifugal machine having a rotatable basket and means for rotating the basket, of timer mechanism electrically controlling rotation of said basket for a predetermined interval, governor mechanism responsive to the speed of the basket, gate means electrically coordinated with the governor mechanism and acting at a predetermined speed of the basket to admit the material to be operated upon to the basket, a discharger provided with a plow movable towards and from the periphery of the basket and down and up within said basket, motor means for operating the plow of said discharger, means electrically responsive to the governor mechanism for initiating the operation of the plow of said discharger subsequent to the interval during which said timer mechanism controls the operation of the means for rotating the basket, and means actuated by the governor mechanism for controlling the operation of said basket upon expiration of the control thereof by said timer mechanism.

10. A centrifugal machine involving a rotatable basket, timer mechanism electrically controlling rotation of said basket for a predetermined interval, a gate device controlling the admission to the basket of material to be operated upon, governor mechanism responsive to the speed of the basket, means electrically actuated by said governor mechanism at a predetermined speed of the basket for causing said gate device to assume a position for admitting material to the basket, means acting in response to the quantity of material in the basket for causing said gate device to assume a position stopping the admission of material to the basket, means electrically actuated by the governor mechanism for causing the basket to continue to rotate subsequent to the predetermined interval during which the timer mechanism acts, a discharger provided with a rotatable and longitudinally movable shaft having a plow device secured thereto, means electrically actuated by said governor mechanism for initiating the operation of the discharger subsequent to the interval during which said timer mechanism acts, means coordinated with movement of the plow of the discharger for stopping the operation thereof, and means responsive to a predetermined operation of the plow of the discharger for causing said timer mechanism to again control the rotation of said basket.

11. A centrifugal machine involving a rotatable basket, a vertically extending shaft to which said basket is secured, means for charging the basket with the material to be operated upon, a discharger having a plow extending into said basket and operable to cause the discharge of material from the basket, a distributing disk secured to said shaft within said basket and spaced upwardly from the bottom of said basket, and a stationary shield device encircling said shaft above said disk and through which the material charged into the basket passes for delivery to the upper surface of the distributing disk, said shield device being provided with a trough portion extending towards said basket charging means in position to receive the charge of material delivered therefrom.

12. Governor mechanism adapted for inclusion in a centrifugal machine provided with a rotatable basket, means for rotating the basket, means for charging the basket with the material to be operated upon, a discharger having a plow operable when the governor mechanism assumes a predetermined position to cause discharge of material from the basket, means for operating the plow of said discharger, and switch means for causing operation of said several previously named means, said governor mechanism involving a rotatable hollow shaft, a slidable member movable vertically with respect to said shaft in response to the speed thereof, a rod supported by said vertically movable member and projecting upwardly through said hollow shaft, means for yieldingly resisting upward movement of said rod, and rectilinearly movable means rigidly secured to said rod and projecting laterally therefrom adapted to constitute means for operating said switch means.

GEORGE W. TOMPKIN.

References Cited in the file of this patent

UNITED STATES PATENTS

| Number | Name | Date |
|---|---|---|
| 1,620,568 | Ordway | Mar. 8, 1927 |
| 1,921,446 | Andrews et al. | Aug. 8, 1933 |
| 1,943,098 | Ter Meer | Jan. 9, 1934 |
| 2,037,655 | Roberts | Apr. 14, 1936 |
| 2,056,885 | Pecker | Oct. 6, 1936 |
| 2,077,053 | Neuman | Apr. 13, 1937 |
| 2,119,644 | Miller | June 7, 1938 |
| 2,130,864 | Steps | Sept. 20, 1938 |
| 2,328,394 | Neuman | Aug. 31, 1943 |
| 2,461,764 | Olcott | Feb. 15, 1949 |
| 2,467,023 | Foster et al. | Apr. 12, 1949 |

FOREIGN PATENTS

| Number | Country | Date |
|---|---|---|
| 679 | Great Britain | of 1870 |
| 587,634 | France | Jan. 20, 1925 |